United States Patent
Mas et al.

(10) Patent No.: US 11,290,389 B2
(45) Date of Patent: Mar. 29, 2022

(54) SYSTEM AND METHOD FOR LATENCY CRITICAL QUALITY OF SERVICE USING CONTINUOUS BANDWIDTH CONTROL

(71) Applicant: DRW Technologies, LLC, Chicago, IL (US)

(72) Inventors: Samuel Philippe Mas, Aldea Nova (ES); Jie Yu, LaSalle (CA); Philip Wolfsberger, Montreal (CA); Vincent Trudel-Lapierre, Longueil (CA); Patrick Grogan, Verdun (CA); Francois-Dominique Richardson, La Prairie (CA); Jun Wu, Pierrefonds (CA)

(73) Assignee: DRW Technologies LLC, Chicago, IL (US)

( * ) Notice: Subject to any disclaimer, the term of this patent is extended or adjusted under 35 U.S.C. 154(b) by 0 days.

(21) Appl. No.: 17/110,256

(22) Filed: Dec. 2, 2020

(65) Prior Publication Data
US 2021/0176183 A1     Jun. 10, 2021

Related U.S. Application Data

(60) Provisional application No. 62/942,299, filed on Dec. 2, 2019.

(51) Int. Cl.
*H04L 12/865* (2013.01)
*H04L 47/6275* (2022.01)
(Continued)

(52) U.S. Cl.
CPC ........ *H04L 47/6275* (2013.01); *H04L 47/527* (2013.01); *H04L 47/623* (2013.01); *H04L 49/9005* (2013.01)

(58) Field of Classification Search
CPC . H04L 49/9005; H04L 47/2441; H04L 47/50; H04L 49/90; H04L 2012/5679;
(Continued)

(56) References Cited

U.S. PATENT DOCUMENTS 10,263,919 B1   4/2019   Matthews et al.
2002/0039351 A1   4/2002   Wang
(Continued)

FOREIGN PATENT DOCUMENTS

EP     1328094     7/2003

OTHER PUBLICATIONS

International Search Report in International Patent Application PCT/US2020/062958, dated Feb. 26, 2021.
(Continued)

*Primary Examiner* — Yemane Mesfin
*Assistant Examiner* — Mon Cheri S Davenport
(74) *Attorney, Agent, or Firm* — Barich IP Law Group

(57) ABSTRACT

A system and method are provided for a bandwidth manager for packetized data designed to arbitrate access between multiple, high bandwidth, ingress channels (sources) to one, lower bandwidth, egress channel (sink). The system calculates which source to grant access to the sink on a word-to-word basis and intentionally corrupts/cuts packets if a source ever loses priority while sending. Each source is associated with a ranking that is recalculated every data word. When a source buffer sends enough words to have its absolute rank value increase above that of another source buffer waiting to send, the system "cuts" the current packet by forcing the sending buffer to stop mid-packet and selects a new, lower ranked, source buffer to send. When there are multiple requesting source buffers with the same rank, the system employs a weighted priority randomized scheduler for buffer selection.

20 Claims, 14 Drawing Sheets

(51) Int. Cl.
*H04L 49/9005* (2022.01)
*H04L 47/52* (2022.01)
*H04L 47/62* (2022.01)

(58) Field of Classification Search
CPC ........... H04L 2012/5681; H04L 47/527; H04L 47/623; H04L 47/6275; H04L 49/9057; G06F 13/1642; G06F 13/1673; G06F 9/544; G11C 11/406; G11C 8/12
See application file for complete search history.

(56) References Cited

U.S. PATENT DOCUMENTS

| | | | |
|---|---|---|---|
| 2003/0231593 A1* | 12/2003 | Bauman | H04L 47/6215 370/235 |
| 2004/0163084 A1* | 8/2004 | Devadas | H04L 47/10 718/103 |
| 2007/0121630 A1 | 5/2007 | Stephen et al. | |
| 2011/0078386 A1 | 3/2011 | Tiedens | |
| 2015/0188850 A1 | 7/2015 | Chan et al. | |
| 2016/0239439 A1 | 8/2016 | Lu | |

OTHER PUBLICATIONS

Written Opinion of the International Searching Authority in the International Patent Application PCT/US2020/062958, dated Feb. 26, 2021.
Extended European Search Report for Europea Patent Application No. 20866932.5, dated Nov. 2, 2021.

* cited by examiner

SYSTEM AND METHOD FOR LATENCY CRITICAL QUALITY OF SERVICE USING CONTINUOUS BANDWIDTH CONTROL

CROSS-REFERENCE TO RELATED APPLICATIONS

The present application claims the benefit of U.S. Provisional Application No. 62/942,299, filed Dec. 2, 2019, entitled "System and Method for Latency Critical Quality of Service Using Continuous Bandwidth Control", which is hereby incorporated by reference in its entirety.

BACKGROUND OF THE INVENTION

The present invention generally relates to a communication system. More particularly, the present invention relates to a communication system that arbitrates access between multiple ingress channels to one output channel.

Prior art communication systems may include multiple input channels and a single egress channel. However, in the prior art, the multiple input channels receive data packets including multiple data words. Once arbitration decisions as to which of the multiple input channels to allow to communicate with the single egress channel have been completed, whole packets are transmitted from the selected input channel to the output channel.

BRIEF SUMMARY OF THE INVENTION

One or more of the embodiments of the present invention provide a bandwidth manager for packetized data that is designed to arbitrate access between multiple, high bandwidth, ingress channels (sources) to one, lower bandwidth, egress channel (sink). The system calculates which source to grant access to the sink on a word-to-word basis and intentionally corrupts/cuts packets if a source ever loses priority while sending. Each source is associated with a ranking that is recalculated every data word. The ranking is increased (decayed) for each data word transmitted by the source and decreased (recovered) for each sink clock cycle during which the source is not allowed to transmit to the sink. When a source buffer sends enough words to have its absolute rank value increase above that of another source buffer waiting to send, the system "cuts" the current packet by forcing the sending buffer to stop mid-packet and selects a new, lower ranked, source buffer to send. When there are multiple requesting source buffers with the same rank, the system employs a weighted priority randomized scheduler for buffer selection.

DETAILED DESCRIPTION OF THE INVENTION

The Continuous Bandwidth Latency Critical (CBLC) Quality of Service (QoS) arbitration system is a bandwidth manager for packetized data designed to arbitrate access between multiple, high bandwidth, ingress channels (sources) to one, lower bandwidth, egress channel (sink). The CBLC QoS arbitration system is unique in that it calculates which source to grant access to the sink on a word-to-word basis and intentionally corrupts packets if a source ever loses priority while sending. This is different from other QoS schemes that typically operate at the granularity of full packets, and do not have a mechanism to corrupt packets to achieve minimal latency penalties when switching between sources.

Internally, each source writes packets to a dedicated CBLC QoS buffer. The CBLC QoS arbiter then decides which buffer to grant access to the sink based on a rank value assigned to each buffer with lower ranks having the highest priority. The buffer that is selected to send to the sink has its real rank recalculated every data word sent based on a configurable decay function; conceptually this is known as rank decay. Conversely, each buffer that is not sending to the sink has their real ranks recalculated every word requested by the sink (recovery continues for all buffers even if no buffers have data to send) based on a configurable recovery function; conceptually this is known as rank recovery. The CBLC QoS arbitration system achieves fair bandwidth access to the sink through a traffic policing mechanism known as packet cutting. When a source buffer sends enough words to have its absolute rank value increase above that of another source buffer waiting to send, the CBLC QoS arbiter "cuts" the current in-flight packet by forcing the sending buffer to stop mid-packet and selecting a new, lower ranked, source buffer to send. In the event of multiple requesting source buffers with the same rank, the CBLC QoS arbitration system employs a novel implementation of a weighted priority randomized scheduler for buffer selection.

Figure 1:
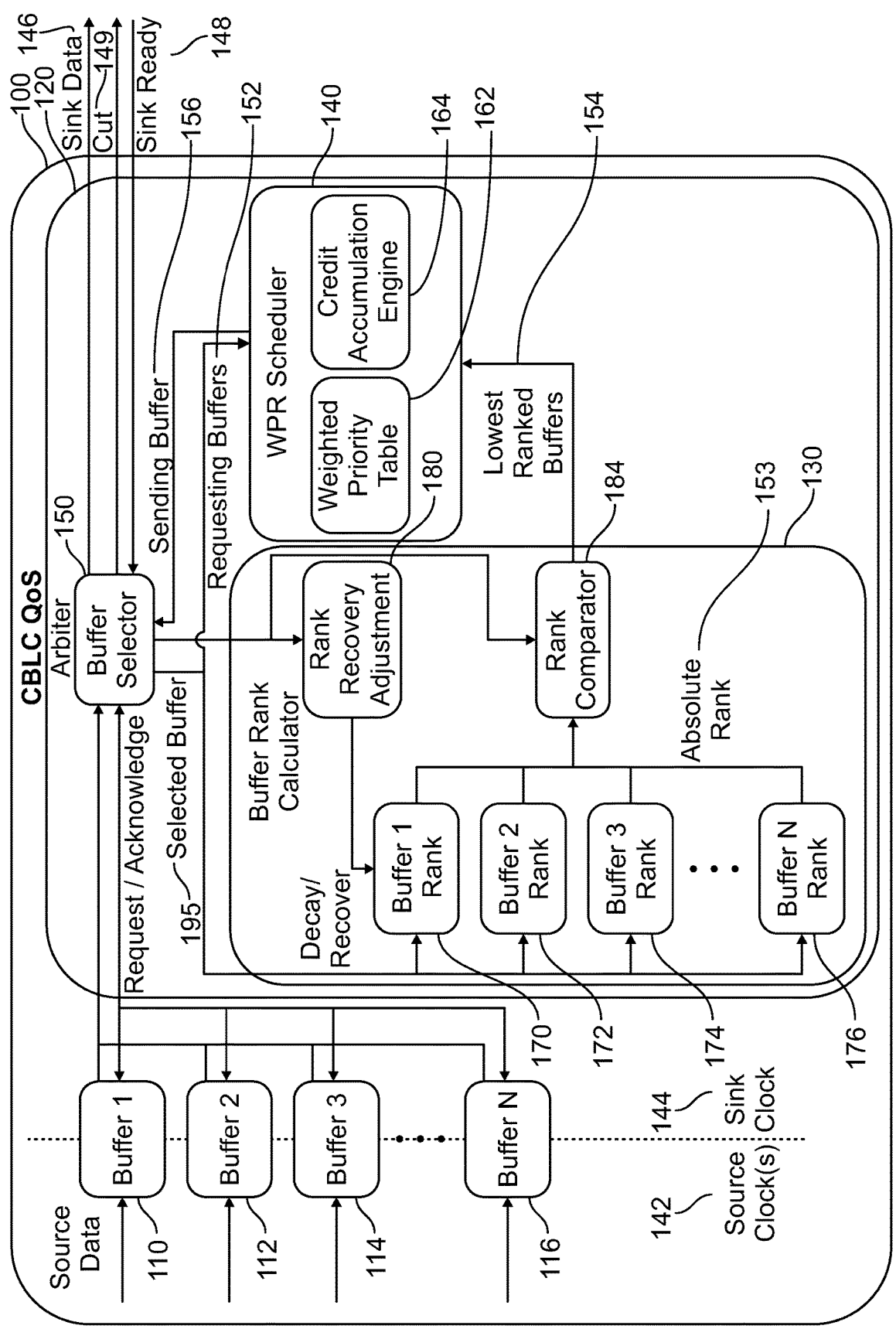
FIG. 1 illustrates a block diagram of the CBLC QoS arbitration system according to an embodiment of the present invention.

FIG. 1 illustrates a block diagram of the CBLC QoS arbitration system 100 according to an embodiment of the present invention. As shown in FIG. 1, the CBLC QoS arbitration system 100 includes source buffers 110-116 and the QoS Arbiter 120. The QoS Arbiter 120 includes the Buffer Rank Calculator 130, the Weighted Priority Randomized (WPR) Scheduler 140, and the Buffer Selector 150. The Buffer Rank Calculator 130 includes buffer rank memories 170-175 for each buffer, a Rank Recovery Adjustment system 180, and a Rank Comparator 184. The WPR Scheduler 140 includes a Weighted Priority Table 162 and a Credit Accumulation Engine (CAE) 164.

Also shown are the source clock(s) 142, sink clock 144, sink data 146, a Sink Ready signal 148 received from the data sink to indicate that the sink is ready to receive data, and a cut signal 149 transmitted to the data sink when a packet has been cut.

Additionally, as shown in FIG. 1, the identities of buffers that are requesting to send data to the sink are transmitted from the Buffer Selector 150 to the Buffer Rank Calculator 130 as requesting buffers information 152. Additionally, the absolute rank of each buffer 153 is transmitted from the buffer rank memories 170-175 to the Rank Comparator 184.

Once the Buffer Rank Calculator 130 determines which of the buffers identified in the requesting buffer information 152 are at the lowest ranking, the Buffer Rank Calculator 130 passes the identity of the one or more lowest ranking buffers to the WPR Scheduler 140 as the lowest ranked buffer information 154. Once the WPR Scheduler 140 has determined which of the buffers identified in the lowest ranked buffer information 154 should now have access to the sink, the WPR Scheduler 140 sends the identity of the chosen buffer to the Buffer Selector 150 as the sending buffer information 156.

Additionally, as further described below, each of the source buffers 110-116 may transmit a sink request 191 to the Buffer Selector 150 indicating that the individual buffer has a data packet to transmit to the sink. The individual buffers receive a buffer acknowledge signal 193 from the Buffer Selector 150 when the specific individual buffer has been selected by the Buffer Selector 150 to transmit its data to the sink.

Also, as further described below, the Buffer Selector 150 transmits selected buffer information 195 to the Buffer Rank Calculator 130 and the WPR Scheduler 140. The selected buffer information 195 indicates which buffer is currently selected to provide data to the sink. Once a sending buffer has been chosen by the WPR Scheduler 140 this information passed to the Buffer Selector 156 and used as the new selected buffer, the selected buffer information 195 is then passed to each of the buffers rank calculators 170-176. Each buffer rank calculator compares its identity to the selected buffer information 195 to determine decay or recover information for that buffer. The decay/recover information indicates whether the buffer is currently transmitting to the sink—and should thus have its real rank decayed by the Buffer Rank Calculator 130 according to the stored decay equation for that buffer—and whether the buffer is not currently transmitting to the sink—and should thus have its real ranks recovered by the Buffer Rank Calculator 130 according to the stored recovery equation for those individual buffers down to the minimum rank configured for the individual buffer.

Turning now to the Source Buffers 110-116, the CBLC QoS arbitration system 100 is designed to support as many source channels as the overall system requirements need by implementing a source buffer per channel. The minimum number of source buffers is preferably two or more, while the maximum is bounded only by the overall system performance requirements. Each source buffer queues packetized data, and is responsible for tracking how many packets it has stored along with how many more packets it may accept before being considered full. The buffer achieves this by implementing a dual asynchronous FIFO system. One FIFO is used to store the actual data of the incoming packets, and the other FIFO is used to store descriptor information such as the start and end addresses of packets in the data FIFO. The buffer is designed to only queue full packets and drop incoming packets if its data FIFO has less available space than the maximum defined packet size for the system or if it has a stored a maximum number of packets (i.e. the descriptor FIFO becomes full). Another feature of the Source Buffers is their ability to perform data width translation. This means the width of the data words being written into any individual Source Buffer's data FIFO can be different then the width of the words being read out and transmitted to the sink Another important role of the source buffers is to transfer data from the source clock domains to the sink clock domain. As the CBLC QoS arbitration system 100 operates at a per word level of granularity, it must be able make decisions every clock cycle. As the QoS arbiter 120 is run in the sink clock domain, all decisions are made at the sink clock rate, and the buffers are responsible for transferring the data and required control signals to the sink clock domain. This is done using common asynchronous FIFO design techniques such as Gray codes used for passing FIFO address pointers from the source to sink clock domains. By implementing the buffers as asynchronous FIFOs, the CBLC QoS system is able to transfer data from multiple independent source clock domains all to one common sink clock domain.

The source buffers transfer data from the source clock domains to the sink clock domains because the buffers may receive data and store it at the clock rate of the source clock 142. The buffers then transmit data to the QoS Arbiter 120 using the sink clock 144 which is also employed by the QoS Arbiter 120. Each source channel, and thus buffer, may be run at a different, independent, source clock frequency. The only requirement the CBLC QoS arbitration system 100 imposes on the system in one embodiment is that the transmit bandwidth of the sink does not exceed the receive bandwidth of any individual source potentially creating a scenario where a buffer's data FIFO may be read faster than it is written to.

When a buffer starts to receive a packet from a source channel, it issues a request downstream to the QoS Arbiter 120 for access to send to the sink 140. A buffer continues to request to send so long as the buffer has data in its queue.

Once the buffer completes sending the current packet, it signals the end of packet to the QoS Arbiter 120 by de-asserting its request signal for at least one clock cycle. At this point, the QoS Arbiter 120 may select a new buffer to start sending, or potentially the same buffer if the buffer still has packets to send and no other buffer is requesting. In the event the QoS Arbiter 120 cuts a buffer while sending mid-packet, it will de-assert the acknowledge 193 signal to the selected buffer. The previously selected buffer interprets this as a cut and either resets its data FIFO read address to the start of the packet to attempt retransmission, or sets the address to the end of the packet to drop it entirely from its queue depending on its configured mode or the number of times the packet has already been retried.

Turning now to Buffer Selector 150, the Buffer Selector 150 of the QoS Arbiter 120 controls the forwarding of data from the source buffers 110-116 to the data sink 146. A single word of data from the selected source buffer is forwarded to the sink 146 for every clock cycle that the sink asserts its Ready signal 148. The Ready signal 148 from the sink controls the rate at which the CBLC QoS arbitration system 100 may send data, and thus directly controls the bandwidth of the system. The CBLC QoS arbitration system 100 does not impose any requirements on how often the Ready signal 148 may be asserted or its periodicity.

Independently of the Ready signal 148, each clock cycle the Buffer Selector 150 evaluates if the current buffer selected to send matches the selected buffer from the WPR Scheduler 140. When there is a mismatch, the Buffer Selector 150 immediately switches the selected source buffer (as further described below) and informs the downstream sink of a cut event using cut signal 149.

The Buffer selector 150 also communicates to the Buffer Rank Calculator 130 the current requesting state of all buffers as well as which buffer is sending. The Buffer Rank Calculator 30 uses this information to determine which buffer to select when comparing buffer ranks and controlling the decay and recovery of each buffer's rank.

Even if no buffers are requesting to send, the Buffer Selector 150 still signals to the Buffer Rank Calculator 130 every cycle the sink asserts the Ready signal 148 in order to allow the Buffer Rank Calculator 130 to continue performing rank recovery for buffers (as further described below) which allows buffers that have previously transmitted data to return to their minimum absolute rank.

Turning now to the Buffer Rank Calculator 130, the Buffer Rank Calculator 130 of the QoS Arbiter 120 repeatedly recalculates the rank of each buffer 110-116 for every cycle the sink asserts the Ready signal. As further described below, the Buffer Rank Calculator 130 increases the rank for the buffer actively sending data to the sink, while at the same time the Buffer Rank Calculator 130 decreases the rank for the remaining buffers that are not sending to the sink. By recalculating each buffer's rank after every word sent, the Buffer Rank Calculator 130 enables the QoS Arbiter 120 to make bandwidth controlling decisions on a word-by-word basis. The Buffer Rank Calculator 130 also compares the ranks of all buffers and forwards a listing of all requesting buffers that are tied for the lowest rank to the WPR Scheduler 140.

Turning now to the WPR Scheduler 140, as further described below, the WPR Scheduler 140 of the QoS Arbiter 120 allows the Buffer Selector 150 to make a fair, randomized, decision whenever the QoS Arbiter 120 must select a new buffer to send among multiple requesting buffers tied for the lowest rank that are transmitted to the WPR Scheduler 140 from the Buffer Rank Calculator 130 as the lowest ranked buffer information 154. The WPR Scheduler 140 also receives the selected buffer information 195 from the Buffer Selector 150.

When there is only one buffer identified in the lowest ranked buffer information 154 as both having the lowest rank and requesting to send, the WPR Scheduler 140 simply selects that buffer as the next sending buffer and forwards the identify of that buffer to the Buffer Selector 150 as the sending buffer information 156.

However, in the event that multiple buffers are identified in the lowest ranked buffer information 154 as being are tied for the lowest rank and requesting to send, the WPR Scheduler 140 uses a Weighted Priority Table 162 (as further described below), which holds configured probability weight for each individual buffer 110-116, to select a new sending buffer from among those buffers that requesting access to the sink and are tied for the lowest rank. This is known as a QoS collision. Buffers with a larger probability weight configuration in the Weighted Priority Table 162 are statistically chosen more often when tied with buffers with a lower probability weight. This enables the CBLC QoS arbitration system 100 to implement a priority hierarchy among buffers, while still allowing all buffers a chance of having their packet sent first (as further described below with regard to Collision Resolution). Once the WPR Scheduler 140 selects a buffer to send from among multiple requesting buffers identified in the lowest ranked buffer information 154 during a collision, the WPR Scheduler 140 continues to select the same buffer and transmit it to the Buffer Selector 150 as sending buffer information 156 as long as the selected buffer remains tied for the lowest rank or stops requesting to send (e.g., packet completion) as signaled by the Buffer Selector 150.

In one embodiment, the WPR Scheduler 140 also includes a configurable Credit Accumulation Engine (CAE) 164 that is used to tune the buffer selection process during collision resolution. The CAE 164 samples the information of the lowest ranked requesting buffers 154 from the Buffer Rank Calculator 130 at a periodic configurable interval (e.g every 100 ns). When the CAE 164 determines that there are buffers requesting to send that are not currently selected to send, the CAE 164 awards a configurable number of credits (e.g. 1 credit) to one of the waiting buffers. When only a single buffer is requesting to send, but not currently selected to send, the credit is awarded to that buffer automatically. Alternatively, when there are multiple buffers waiting to send at any given interval period, the CAE 164 uses the individual buffer priorities included in the Weighted Priority Table 162 to award the credit to one of the waiting buffers. The CAE 164 then stores the number of credits awarded to each buffer.

When the currently sending buffer completes sending its packet, or is cut, the WPR Scheduler 140 first identifies all of the lowest ranked buffers that are desiring to send from the lowest ranked buffer information 154. The WPR Scheduler 140, then retrieves the number of credits that have been awarded to the specific buffers identified in the lowest ranked buffer information 154. The WPR Scheduler 140 then identifies the buffer with the greatest number of accumulated credits and transmits the identity of that buffer to the Buffer Selector 150 as the sending buffer information 156. When the identity of the buffer is transmitted to the Buffer Selector 150, the credits associated with the chosen buffer are cleared back to zero.

In the event that there are more than one buffers identified in the lowest ranked buffer information 154, and one or more of the buffers identified in the lowest ranked buffer information 154 also have the same number of accumulated credits, the WPR Scheduler 140 then retrieves from the WPT 162 the probability weights associated with the one or more buffers having the same amount of accumulated credits and randomly chooses one of the buffers based on their relative probability weights. The chosen buffer is then transmitted to the Buffer Selector 150 as the sending buffer information 156. As above, when the identity of the chosen buffer is transmitted to the Buffer Selector 150, the credits associated with the chosen buffer are cleared back to zero.

By configuring the number of credits each buffer is awarded when selected by the CAE each interval, the system is able to tune the probability model of the WPR scheduler to be more or less heavily in favor of a buffer's time spent waiting to be selected to send. For example, if each buffer is configured to be awarded credits based on the weights the buffers are assigned in the WPT, the system exponentially favors a buffer the longer the buffer waits to be selected to send as the probability of the WPT and credits awarded by the CAE are essentially multiplied. If each buffer is configured to be awarded the same number of credits, a system that linearly favors a buffer the longer it waits to send may be achieved.

Turning now to the Buffer Rank Calculator 130, the rank calculation process for individual buffers will now be discussed in more detail. As mentioned above, the rank for each individual buffer is calculated by the Buffer Rank Calculator 130 every clock cycle that the sink asserts its ready signal 148. The individual buffer that is actually selected to send to the sink during a particular clock cycle are identified as "decaying" and has its rank increased based on its individual rank decay formula [δn(x)]. Conversely, the buffers that are not sending to the sink during a particular sink ready cycle are identified as "recovering" and have their ranks decreased based on their individual rank recovery formulas [ρn(x)]. As discussed above, only one buffer is selected to transmit data to the sink during a particular clock cycle. Consequently, only the selected individual buffer decays during that sink ready cycle, while all of the other remaining buffers either recover, or remain unchanged if they have already recovered to their minimum rank as described below. Alternatively, when no buffers have any remaining data to send to the sink, all buffers will recover, or remain unchanged if they have already recovered to their minimum rank as described below. Each buffer may have an independent decay formula and an independent recovery formula because the Buffer Rank Calculator 130 calculated and tracks the rank for each buffer 110-116 independently.

The minimum and maximum rank for each buffer is independently configurable and is stored in the Buffer Rank Calculator in the buffer rank memory 170-175 for each buffer. A buffer's minimum rank limit is the initial rank value the buffer starts at prior to sending any data to the sink. The minimum rank is also the lowest rank value a buffer may decrease to while recovering. Similarly, the maximum rank limit is the largest rank value a buffer may increase to while decaying.

The minimum and maximum rank configuration may be used to build hierarchies of priority between separate buffers. For example, consider a two buffer system where Buffer[2] is configured to have a minimum rank value of 2 while Buffer[1] is configured to have a minimum rank of 1. In this system, when Buffer[1] and Buffer[2] are at their minimum ranks, Buffer[1] is selected due to its lower minimum rank of 1. However, as Buffer[1] transmits data to the sink, the ranking of Buffer[1] increases according to the decay function stored for Buffer[1] for each word of data transmitted. Only once Buffer[1] decays so that its ranking equals that of Buffer[2] may Buffer[2] be identified as one of the lowest ranked buffers and potentially be selected for transmission of data to the sink using the WPT 162 during a collision.

In terms of calculating the rank for an individual buffer at any one time, a buffer's rank may be broken down into two values: a real rank [R(x)] and an absolute rank [R'(x)] which is an integer-only number derived from the real rank [R(x)]. The real rank is implemented as a 32-bit value with the most significant 8-bits used as the absolute rank. With this implementation, the real rank can be represented as any real number between 0.0 and 255.99999994 (with a precision of $\frac{1}{2^{24}}$) and the absolute rank being any whole number between 0 and 255. In another embodiment, the real rank may be implemented as a 64-bit register.

A buffer's real rank [R(x)] is a non-negative real value calculated by the Buffer Rank Calculator 130 and used by it internally as described herein. A buffer's real rank may start at the buffer's minimum rank for a buffer that is fully recovered. Conversely, if a buffer has currently decayed to a higher rank, the buffer's real rank may be a higher value. While decaying, a buffer's real rank is determined using its decay formula. A buffer's decay formula may be any constant or variable function that suits the needs of the system. For example, an exponential decay function of $\delta(x)=x^2$ may be employed as the decay formula for a buffer which implements a decay that exponentially penalizes the buffer for sending large packets by causing the ranking of the buffer to grow rapidly for each word in a packet sent. Conversely, a buffer employing a logarithmic decay function of $\delta(x)=\log(x)$ penalizes the buffer for sending multiple short packets by penalizing a buffer more severely for the first few words of a packet being sent. A buffer employing a linear decay function gives equal weight to each word sent regardless to how large or small the packets are that it is trying to send.

The buffer's absolute rank [R'(x)] is the integer representation of the real rank calculated by rounding down the real rank to the next integer value. The absolute rank is the value used by the Buffer Rank Calculator 130 rank comparator 184 to determine which of the one or more buffers have the lowest absolute rank.

Similar to the calculation of the buffer's real rank using its individual decay formula while decaying (transmitting data), the calculation of the buffer's real rank while recovering (not transmitting data) uses the buffer's individual recovery formula. Similar to its decay formula, a buffer's recovery formula may be any constant or variable function that suits the needs of the system. For example, an exponential recovery function of $\rho(x)=x^2$ implements a recovery that penalizes the buffer for trying to send packets too often as it would recover slowly just after sending (as further illustrated in the rank calculation example below).

In terms of formulae, the Real Rank Decay Formula may be expressed as:

$$Rn(x)=Sn+\delta n(x)$$

Where Rn(x) is the real rank being calculated for the $x^{th}$ word sent from Buffer[n], Sn is initial real rank value Buffer[n] started decaying from, and δn(x) is the decay function for Buffer[n].

Similarly, the Real Rank Recovery Formula may be expressed as:

$$Rn(x)=Sn-\rho n(x)$$

Where Rn(x) is the real rank being calculated for the $x^{th}$ word not sent from Buffer[n], Sn is initial real rank value Buffer[n] started recovering from and ρn(x) is the recovery function for Buffer[n].

Additionally, the Absolute Rank Formula may be expressed as:

$$Rn'(x)=\text{floor}(Rn(x))$$

Where Rn'(x) is the absolute rank being calculated for the current requested word, floor( ) is the mathematical floor function, and Rn(x) is the real rank being calculated for the current requested word for Buffer[n]

Figure 2:
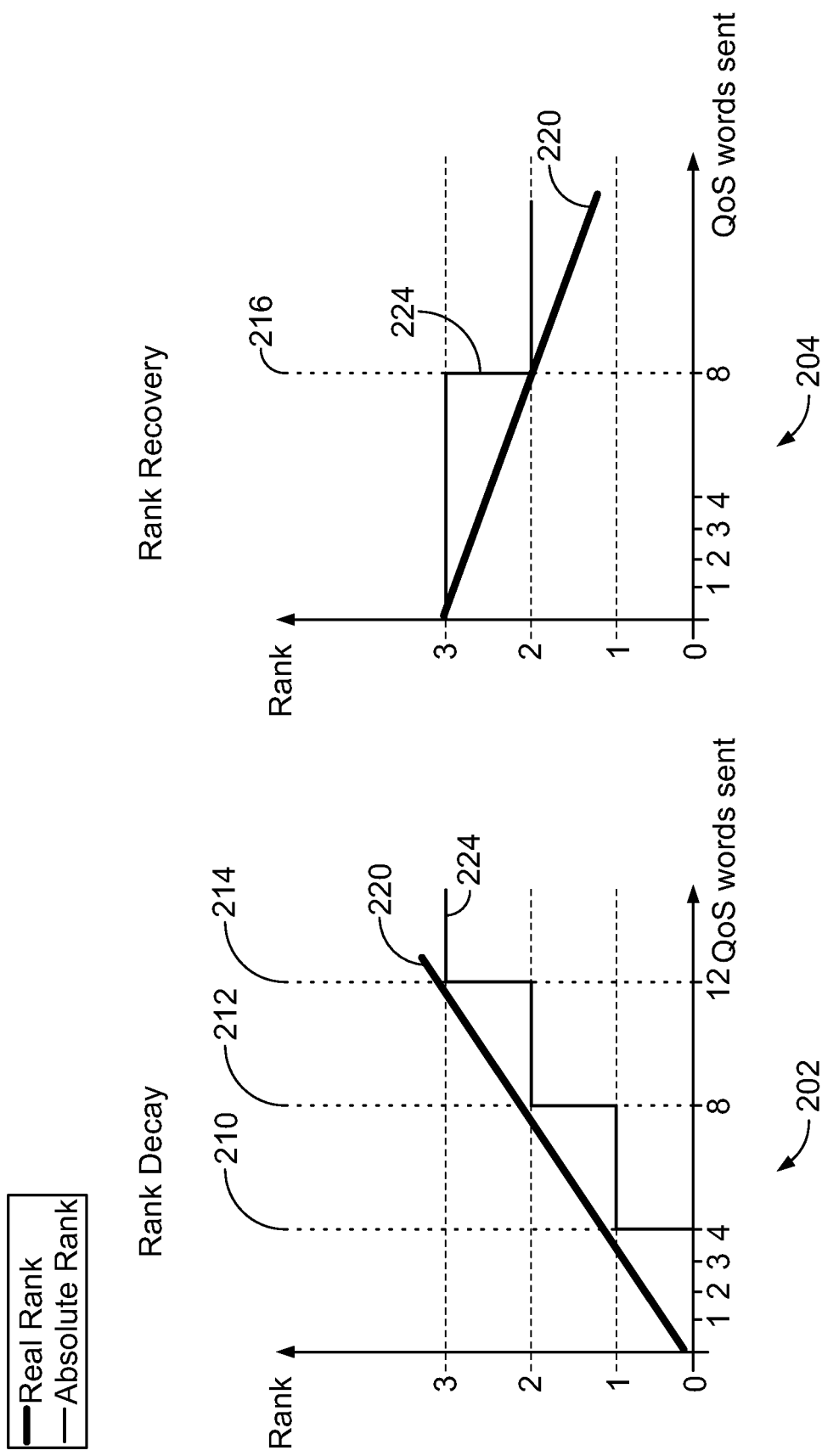
FIG. 2 illustrates a graphical representation of a buffer's rank while decaying and a graphical representation of a buffer's rank while recovering.

FIG. 2 illustrates a graphical representation of a buffer's rank while decaying 202 and a graphical representation of a buffer's rank while recovering 204. In this example the buffer's decay function is set to a linear function of $\delta_n(x)=C_D*x$ where $C_D$ is a decay constant and x is the number of sink ready cycles of decay that the buffer has experienced; which is proportional to the number of words sent by the buffer. Similarly, the buffer's recovery function is $\rho_n(x)=C_R*x$ where $C_R$ is a recovery constant and x is the number of sink ready cycles of recovery that the buffer has experienced; which is proportional to the number of ready signals from the sink in which the buffer did not send a word. In FIG. 2, $C_D$ is set to 0.25 and $C_R$ is set to 0.125 ($C_D/2$).

As shown in FIG. 2 in the graphical representation of a buffer's rank while decaying 202, the vertical axis represents the rank of the buffer and the horizontal axis represents the number of words sent by the buffer while decaying. As described above, as the buffer sends words, the buffer's real rank increases using the buffer's decay function which is shown as the real rank 220. Additionally, the buffer's absolute rank 224 is determined by rounding the buffer's real rank down to the next lowest integer as shown. As shown in the graphical representation of a buffer's rank while decaying 202, the buffer's absolute rank increases from its initial minimum rank of 0 to a rank of 1, 2, and subsequently 3 after transmitting 4, 8, and 12 words respectively; represented by the dotted vertical lines 210-214.

As shown in FIG. 2 in the graphical representation of a buffer's rank while recovering 204, the vertical axis again represents the rank of the buffer and the horizontal axis again represents the number of words sent by the buffer while recovering. As described above, for each sink request in which the individual buffer does not send a word, the buffer's real rank decreases using the buffer's recovery function which is shown as the real rank 220. Additionally, the buffer's absolute rank 224 is determined by rounding the buffer's real rank down to the next lowest integer as shown. As shown in the graphical representation of a buffer's rank while recovering 202, the buffer's absolute rank decreases from its starting rank of 3, where it stops decaying, to a rank of 2 after not transmitting data for 8 sink ready cycles; represented by the dotted vertical line 216.

Figure 3:
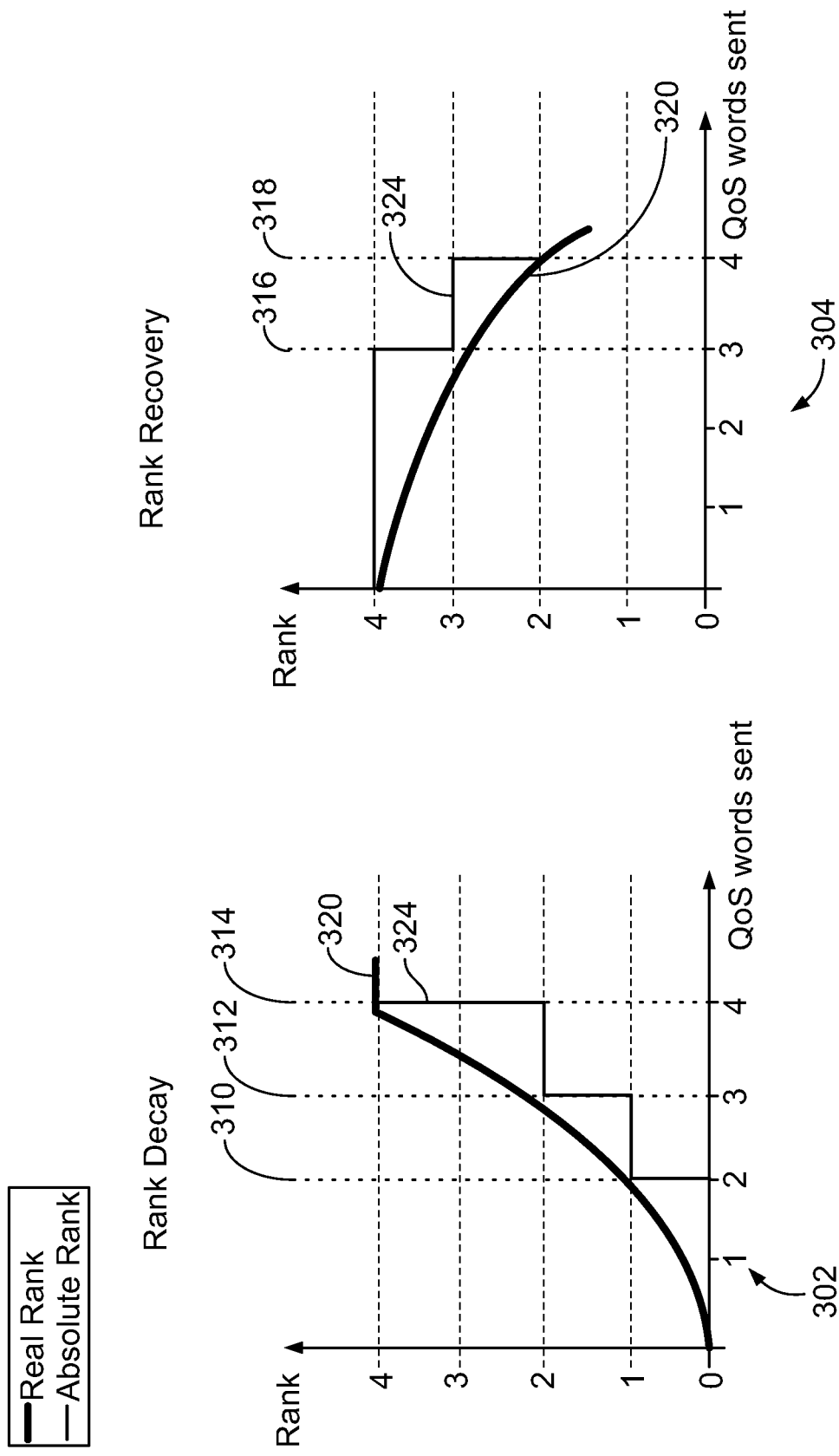
FIG. 3 illustrates a graphical representation of a buffer's rank while decaying and a graphical representation of a buffer's rank while recovering while using a different decay formula and recovery formula than that shown in FIG. 2.

FIG. 3 illustrates a graphical representation of a buffer's rank while decaying 302 and a graphical representation of a buffer's rank while recovering 304 while using a different decay formula and recovery formula than that shown in FIG. 2. In FIG. 3, the buffer's decay function is a set to an exponential function of $\delta_n(x)=C_D*x^2$ and the buffer's recovery function is $\rho_n(x)=C_R*x^2$. In FIG. 3, $C_D$ is set to 0.25 and $C_R$ is set to 0.125 ($C_D/2$).

As shown in FIG. 3 in the graphical representation of a buffer's rank while decaying 302, the vertical axis represents the rank of the buffer and the horizontal axis represents the number of words sent by the buffer while decaying. As described above, as the buffer sends words, the buffer's real rank increases using the buffer's decay function which is shown as the real rank 320. Additionally, the buffer's absolute rank 324 is determined by rounding the buffer's real rank down to the next lowest integer as shown. As shown in the graphical representation of a buffer's rank while decaying 302, the buffer's absolute rank increases from its initial minimum rank of 0 to a rank of 1, 2, and subsequently 4 after transmitting 2, 3, and 4 words respectively; as represented by the dotted vertical lines 310-314

As shown in FIG. 3 in the graphical representation of a buffer's rank while recovering 304, the vertical axis again represents the rank of the buffer and the horizontal axis again represents the number of words sent by the buffer while recovering. As described above, for each sink request in which the individual buffer does not send a word, the buffer's real rank decreases using the buffer's recovery function which is shown as the real rank 320. Additionally, the buffer's absolute rank 324 is determined by rounding the buffer's real rank down to the next lowest integer as shown. As shown in the graphical representation of a buffer's rank while recovering 304, the buffer's absolute rank decreases from its starting rank of 4, where it stops decaying, to a rank of 3 and subsequently 2 after not transmitting data for 3 and 4 sink request cycles respectively; as represented by the dotted vertical lines 316 and 317.

FIG. 3 illustrates how the selection of a different decay function and recovery function configuration may influence the overall system performance. The decay formula chosen for FIG. 3 shows that if a buffer attempts to send a large number of words to the sink, either by sending large packets or several back-to-back packets, the buffer's rank decays exponentially faster, which is likely to give other buffers a chance to send more rapidly. Similarly, the recovery formula chosen for FIG. 3 shows that if a buffer does not wait a sufficient amount of time between sending packets, the buffer's rank does not recover to low enough to allow the buffer to likely regain priority over other buffers.

In one embodiment, the Buffer Rank Calculator 130 includes a rank recovery adjustment system 180. The rank recovery adjustment system 180 adjusts a buffer's real rank (which may impact the buffer's absolute rank) during recovery based on how long the buffer waited before being granted access to send to the sink. This is known as rank recovery adjustment. When rank recovery adjustment is enabled, for each buffer, the Rank Calculator tracks and stores the number of ready cycles the sink requested data but the waiting buffer was not selected to send. For each request for which the waiting buffer failed to send, the rank recovery adjustment system 180 calculates a rank recovery adjustment value using the individual buffer's rank recovery formula.

When the waiting buffer is finally selected to send, the buffer's rank decays as normal using the buffer's rank decay formula. However, once the buffer experiences a first request cycle of recovery following the completion of the buffer's packet, the recovery adjustment value is applied once to the first request cycle of recovery. The recovery adjustment system also has a configuration that may apply the same recovery adjustment value to the first request cycle of recovery if the packet is cut as well. If this configuration is disabled, the recovery adjustment system does not apply the recovery adjustment value to the first request cycle of recovery if the packet is cut.

Once the recovery adjustment value is applied to a buffer's rank, it is cleared so that a new recovery value may be calculated the next time the buffer is forced to wait to send, and the buffer continues to recover as normal using its recovery function. The net effect of the recovery adjustment is to force the rank recovery curve to fit the expected recovery curve had the buffer experienced no delay in sending its packets.

When the rank recovery adjustment is disabled, the buffer's absolute rank decay and recovery time is delayed compared to expected time had the packet not been delayed in sending. Conversely, when the rank recovery adjustment is enabled, the buffer's absolute rank decay time is still shifted, however the recovery time is adjusted at the first non-sending cycle to match the expected recovery rank had the buffer not been delayed in sending. Additionally, when applying a rank recovery adjustment, the rank recovery adjustment system 180 ensures that the adjustment applied does not cause the rank to decrease below the buffer's minimum rank configuration.

Figure 4:
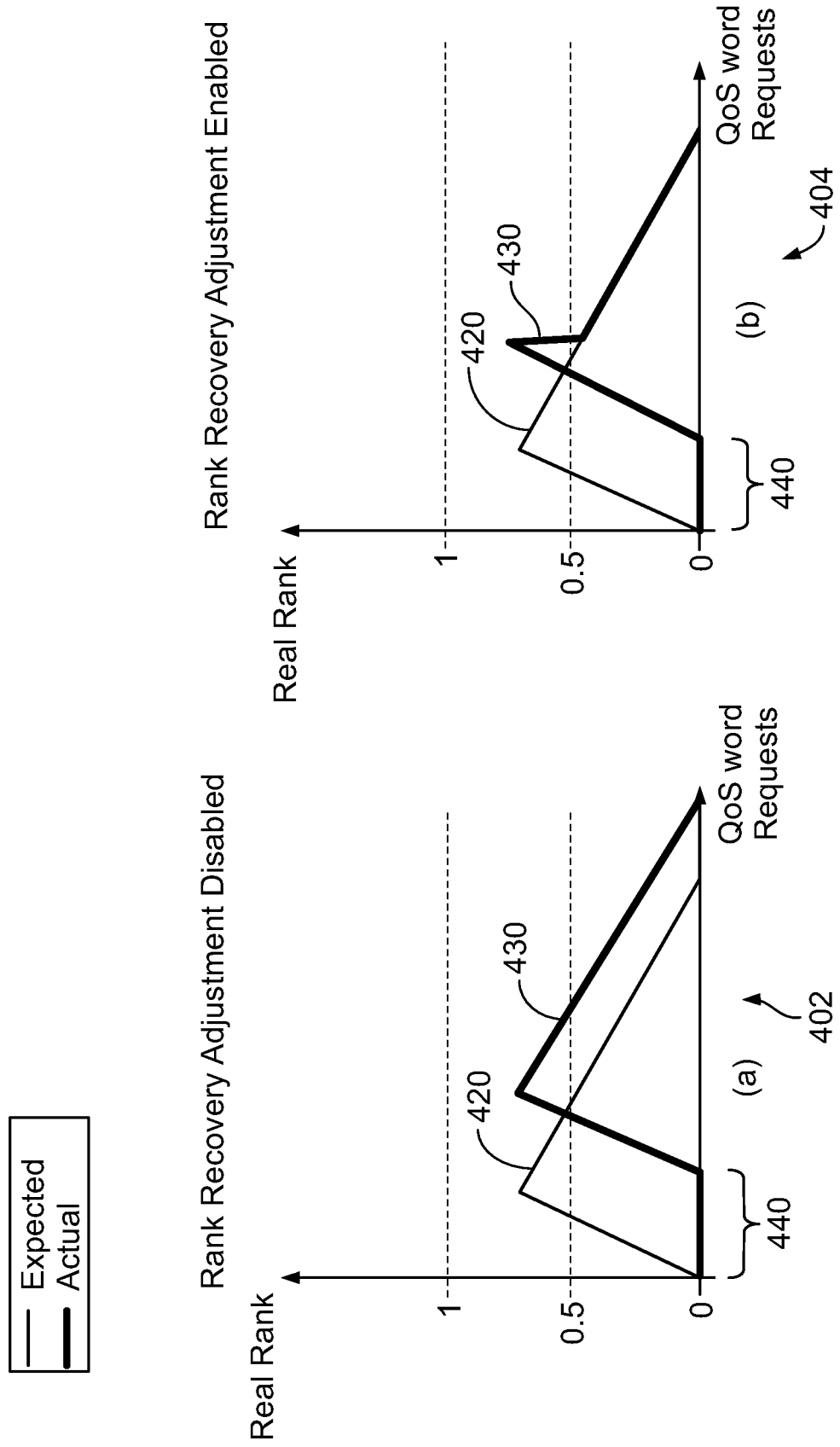
FIG. 4 gives an example of a buffer's rank decay and recovery curve when the rank recovery adjustment system is disabled and enabled.

FIG. 4 gives an example of a buffer's rank decay and recovery curve when the rank recovery adjustment system 180 is disabled 402 and enabled 404. As shown in FIG. 4 in the buffer's rank decay and recovery curve when the rank recovery adjustment system 180 is disabled 402, the vertical axis represents the rank of the buffer and the horizontal axis represents the number of words sent by the buffer while decaying. FIG. 4 shows an expected decay and recovery curve 420 and an actual decay and recovery curve 430. The expected decay and recovery curve 420 is the recovery curve that would have transpired if the buffer had begun transmitting data at time zero and ceased transmitting data when the curve 420 reached its peak. In actuality, the initial transmission of the buffer was delayed by the delay time 440. However, once the transmission of the buffer commenced after the delay time 440, the actual decay and recovery curve 430 is the actual decay and recovery curve experienced by the buffer. As shown in 402, when the rank recovery adjustment system 180 is disabled, the actual decay and recovery curve 430 matches the expected decay and recovery curve 420, just shifted right by the delay time 440.

As shown in FIG. 4 in the buffer's rank decay and recovery curve when the rank recovery adjustment system 180 is enabled 404, the vertical axis again represents the rank of the buffer and the horizontal axis again represents the number of words sent by the buffer while decaying. The expected decay and recovery curve 420 and the actual decay and recovery curve 430 are also shown. Again, in the actual decay and recovery curve 430 the transmission of the buffer was delayed by the delay time 440. However, because the rank recovery adjustment system 180 is now enabled, once the actual curve 430 reaches its peak and the buffer ceases transmitting, the rank recovery adjustment is immediately applied, which immediately reduces the actual decay and recovery curve 430 to match the estimated decay and recovery curve 420 that the buffer would have experienced if the buffer had not experienced a delay. In this fashion, the ranking of the buffer that was previously delayed recovers to a lower ranking faster than it would have otherwise—which in turn increases the likelihood that the buffer will be selected for data transmission faster. That is, when rank recovery adjustment is disabled the buffer's absolute rank decay and recovery time is delayed compared to expected time had the packet not been delayed in sending. Conversely, when rank recovery adjustment is enabled, the buffer's absolute rank decay time is still shifted, however the recovery time is adjusted to match the expected recovery time had the buffer not been delayed in sending.

A collision is defined as whenever the Buffer Selector 150 must select a new buffer to send to the sink from among multiple requesting buffers all tied for the lowest rank. This occurs when either a packet completes sending or a buffer is cut due to its rank no longer being the lowest. To resolve these collision scenarios, the Buffer Selector 150 relies on the WPR Scheduler 140. The goal of the WPR Scheduler 140 is to provide another layer of configuration to achieve a buffer priority hierarchy structure that meets the system requirements. The WPR Scheduler 140 achieves this by using two mechanisms, a configured Weighted Priority Table 162 and an optional Credit Accumulation Engine 164. The Weighted Priority Table 162 is the main mechanism the WPR Scheduler 140 uses to choose a buffer, from among those requesting to send, at random with a desired probability distribution. When the Credit Accumulation Engine 164 is disabled, the WPR Scheduler 140 uses the Weighted Priority Table 162 only at collision times when a new buffer must be selected to send. Conversely, when the Credit Accumulation Engine 164 is enabled, the WPR Scheduler 140 uses the Weighted Priority Table 162 at periodic intervals to assign credits to buffers that are waiting to send. Then, when a collision must be resolved, the WPR Scheduler 140 selects the buffer with the most accumulated credits, and uses the Weighted Priority Table 162 when a tie must be resolved.

The weighted priority table 162 used by the WPR Scheduler 140 is an N-entry table where N is equal to the number of buffers in the system. Each entry is configured with a probability weight for the buffer corresponding to the index of the entry in the table. The configured weights are intended to represent the probability of selecting a particular buffer with respect to all other buffers in the system, and the total probability sums to 100%. For example, consider a system that has four buffers and thus has a weighted priority table with four entries. In this example, if we assumed the desired probability weights for the four buffers are 40%, 20% 30%, and 10% respectively, the weighted priority table would be configured as follows:

TABLE 1

Example weighted priority table

| Entry | 1 | 2 | 3 | 4 |
|---|---|---|---|---|
| Buffer Probability Weight (%) | 40 | 20 | 30 | 10 |

The Weighted Priority Table 162 is used by the WPR Scheduler 140 to continuously select a buffer to send from the lowest ranked buffers at random every clock cycle. As mentioned above, the WPR Scheduler 140 receives the selected buffer information 195 from the Buffer Selector 150. Thus, the WPR Scheduler is aware of which buffer is currently selected to transmit data to the sink. While the currently selected buffer is still sending and is still among the buffers with the lowest rank, the WPR Scheduler simply informs the Buffer Selector to maintain the current selected buffer as the sending buffer. As soon as the currently selected buffer stops requesting to send (i.e. it completes sending it current packet) or the Buffer Rank Calculator informs the WPR scheduler that current selected buffer no longer has the lowest rank among requesting buffer (i.e. a cut occurs), the WPR scheduler signals to the Buffer Selector to select a new sending buffer. This is why the WPR Scheduler continuously evaluates which buffer should be the next sending buffer from among those not currently selected to send every clock cycle. By restricting its selection process to only actively requesting buffers that are not sending, the Weighted Priority Table 162 uses the global buffer priority weights assigned to derive relative priority weights. The probability of selecting a requesting buffer at any given clock cycle is then derived from these relative priority weights. For example, if we consider a scenario where Buffer[1] is currently sending a packet while Buffers[2] and [3] are requesting to send, the relative probability weights are as follows:

TABLE 2

Example weighted priority table selection

| Entry | 1 | 2 | 3 | 4 |
|---|---|---|---|---|
| Buffer Probability Weight (%) | 40 | 20 | 30 | 10 |
| Relative Probability Weight (%) | 0 | 40 | 60 | 0 |

Table 2 shows that Buffer[2] would have a 40% chance of being selected while Buffer[3] would have a 60% chance. Thus, the relative probabilities for Buffers[2] and [3] maintain the global 2:3 probability ratio for the same buffers configured in the Weighted Priority Table. To resolve collisions, the WPR Scheduler 140 uses the results of the Weighted Priority Table 162 to either select a new sending buffer directly when the CAE 164 is disabled, or to assign buffers credits at fixed intervals when the CAE 164 is enabled.

When the CAE 164 is disabled, the WPR Scheduler 140 uses the output of the Weighted Priority Table 162 directly to resolve collisions. The WPR Scheduler 140 does this by evaluating the decision flow outlined below in the flowchart of FIG. 5 for every clock cycle. If we consider the previous example where Buffer[1] is currently sending a packet while Buffers[2] and [3] are requesting to send, the probability of selecting either Buffer[2] or [3] is given by their relative probability weights shown in Table 2. Assuming Buffer[1] completes sending its packet and its Rank never increases above that of Buffers[2] and [3], the WPR Scheduler 140 then selects between Buffers [2] and [3] to send next the moment Buffer[1] completes its packet. Again, Buffer[2] has a 40% chance of being selected while Buffer[3] has a 60% chance.

Figure 5:
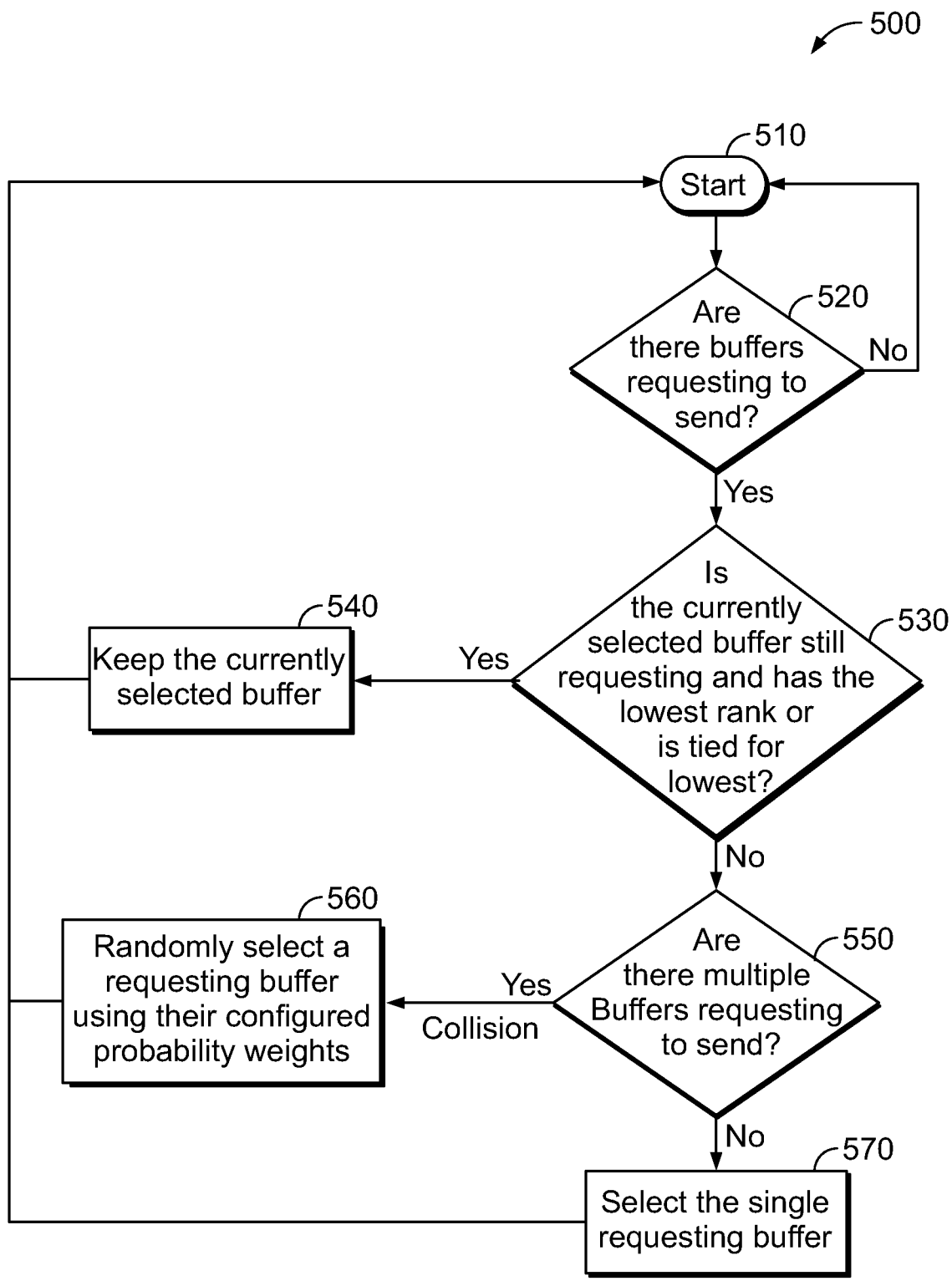
FIG. 5 illustrates a flowchart of the WPR Scheduler decision flow without CAE, according to an embodiment of the invention.

FIG. 5 illustrates a flowchart 500 of the WPR Scheduler 140 decision flow without CAE 164, according to an embodiment of the invention. Beginning at the start 510, the process proceeds to step 520 where the WPR Scheduler 140 determines whether there are buffers requesting to send data to the sink. If no buffers are requesting to send data to the sink, the process proceeds back to the start 510 and awaits the next clock cycle. Conversely, when there are buffers that are requesting to send data to the sink, the process proceeds to step 530. At step 530, the WPR Scheduler 140 determines whether the currently selected buffer is still requesting to send data and either has the lowest rank or is tied for lowest rank. When the currently selected buffer is still requesting to send data and either has the lowest rank or is tied for lowest absolute rank, the process proceeds to step 540 and the WPR Scheduler 140 keeps the currently selected buffer as the selected buffer. The identity of the selected buffer is transmitted to the buffer selector 150 as the sending buffer data 156. The process then proceeds back to the start 510 and awaits the next clock cycle.

Conversely, when either the currently selected buffer is no longer requesting to send or the currently selected buffer is no longer lowest or tied for lowest absolute rank, the process proceeds to step 550. At step 550, the WPR Scheduler 140 determines the one or more buffers having the lowest absolute rank. When there is only one buffer that has the lowest absolute rank, the process proceeds to step 570 and the single buffer with the lowest absolute rank is selected. The identity of the selected buffer is transmitted to the buffer selector 150 as the sending buffer data 156. The process then proceeds back to the start 510 and awaits the next clock cycle.

Conversely, when there are multiple buffers that are requesting to send that are at the lowest absolute rank, the process proceeds to step 560. At step 560, the WPR Scheduler 140 randomly selects one of the requesting buffers using their relative probability weights from the WPT 162. For example, if there are two buffers at the lowest priority that are requesting to send and Buffer[2] has a 40% relative probability and Buffer[3] has a 60% probability, the WPR Scheduler 140 may randomly determine a number between 1 and 100. When the number is between 1 and 40, Buffer[2] is selected. When the number is between 41 and 100, Buffer[3] is selected. The identity of the selected buffer is transmitted to the buffer selector 150 as the sending buffer data 156. The process then proceeds back to the start 510 and awaits the next clock cycle. In another embodiment of the WPT randomized selection mechanism, the WPT assigns Buffer[2] 40 non-contagious values between 1 and 100 and assigns Buffer[3] 60 non-contagious values. The WPT then selects a value from 1 to 100 at random each clock cycle and chooses the buffer assigned to that value.

Alternatively, when the CAE 164 is enabled, the WPR Scheduler 140 uses the output of the Weighted Priority Table 162 in two ways. The first is to use the Weighted Priority Table's randomized buffer selection to assign credits to waiting buffers at fixed intervals. The second is to make a final decision on which buffer should send next at the time of a collision when there is a tie for which buffer has accumulated the most credits.

By assigning credits to buffers that are waiting to send at fixed intervals, the WPR Scheduler 140 enables the system to give more weight to buffers that wait longer to send. By increasing the interval as to when credits are assigned or by increasing the number of credits assigned to a buffer each interval they are selected, the WPR Scheduler 140 may tune the probability of a buffer being selected at collision resolution time more heavily based on the wait time of the buffer.

Figure 6:
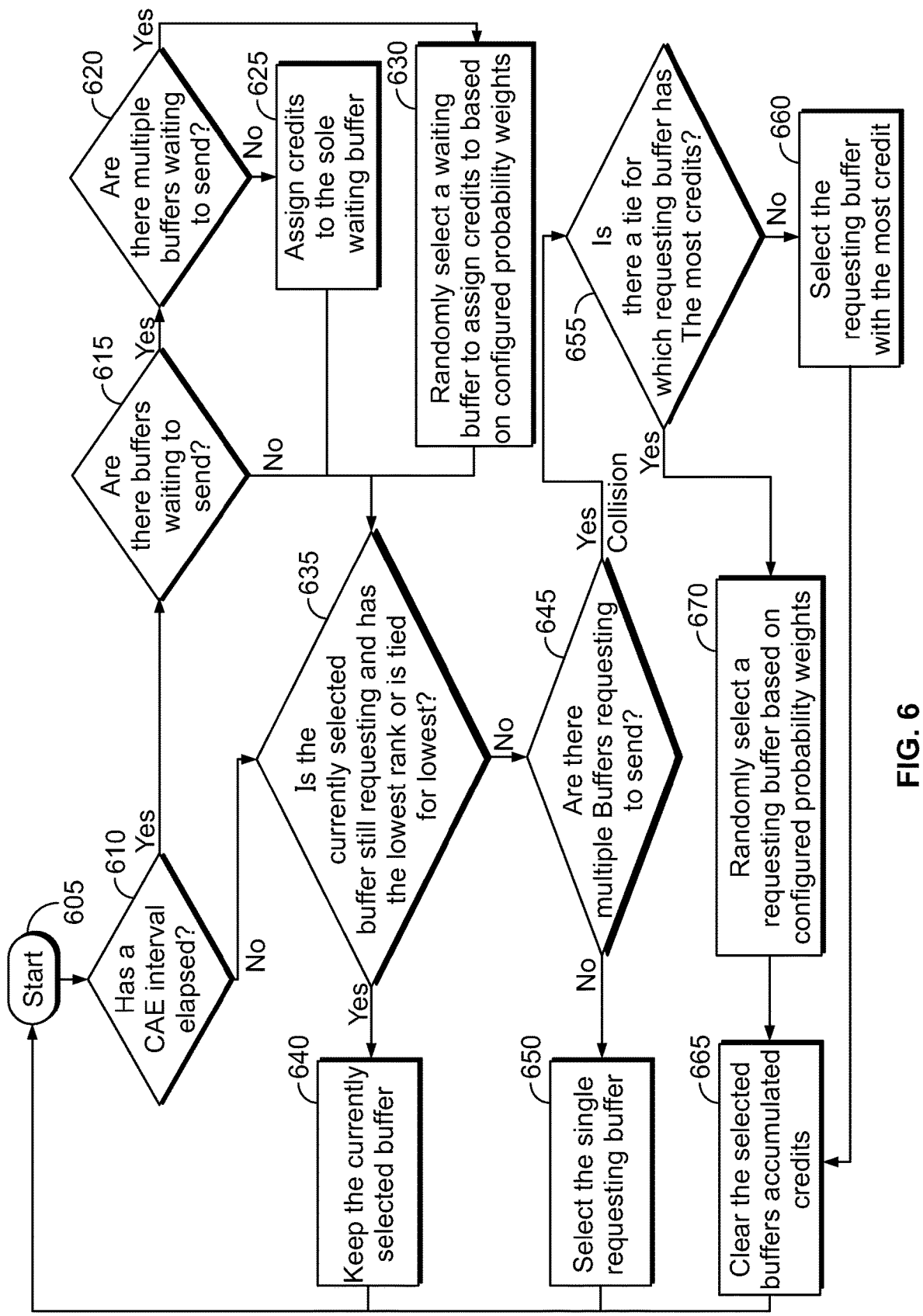
FIG. 6 illustrates a flowchart of the WPR Scheduler decision flow when the CAE is enabled, according to an embodiment of the invention.

FIG. 6 illustrates a flowchart 500 of the WPR Scheduler 140 decision flow when the CAE 164 is enabled, according to an embodiment of the invention. Beginning at the start 605, the process proceeds to step 610, where the WPR Scheduler 140 determines whether a CAE interval has elapsed. The CAE interval may for example be 100 ns. When a CAE interval has elapsed, the process proceeds to step 615.

At step 615, the WPR Scheduler 140 determines whether there are buffers waiting to send. When there are buffers waiting to send, the process proceeds to step 620. At step 620, the WPR Scheduler 140 determined whether there are multiple buffers waiting to send. When there are multiple buffers waiting to send, the process proceeds to step 630 and the WPR Scheduler 140 randomly selects one of the waiting buffers to assign credits to based on the configured probability weights. For example, if there are two buffers waiting to send and Buffer[1] has a 40% relative probability and Buffer[2] has a 60% probability, the WPR Scheduler 140 may randomly determine a number between 1 and 100. When the number is between 1 and 40, Buffer[1] is assigned the credit. When the number is between 41 and 100, Buffer [2] is assigned the credit. The total amount of credit assigned to each buffer is stored by the WPR Scheduler 140. The process then proceeds to step 635.

Returning to step 620, when there is only a single buffer waiting to send, the process proceeds to step 625 and the WPR Scheduler 140 assigns the credit to the sole waiting buffer. The process then proceeds to step 635.

Returning to step 615, when there are no buffers waiting to send, the process proceeds to step 635.

At step 635, the WPR Scheduler 140 determines whether the currently selected buffer is still requesting to send data and either has the lowest rank or is tied for lowest rank. When the currently selected buffer is still requesting to send data and either has the lowest rank or is tied for lowest absolute rank, the process proceeds to step 640 and the WPR Scheduler 140 keeps the currently selected buffer as the selected buffer. The identity of the selected buffer is transmitted to the buffer selector 150 as the sending buffer data 156. The process then proceeds back to the start 605 and awaits the next clock cycle.

Conversely, when either the currently selected buffer is no longer requesting to send or the currently selected buffer is no longer lowest or tied for lowest absolute rank, the process proceeds to step 645. At step 645, the WPR Scheduler 140 determines the one or more buffers having the lowest absolute rank. When there is only one buffer that has the lowest absolute rank, the process proceeds to step 650 and the single buffer with the lowest absolute rank is selected. The identity of the selected buffer is transmitted to the buffer selector 150 as the sending buffer data 156. The process then proceeds back to the start 605 and awaits the next clock cycle.

Conversely, when there are multiple buffers that are requesting to send that are at the lowest absolute rank, the process proceeds to step 655. At step 655, the WPR Scheduler 140 then retrieves the credits associated with each of the multiple buffers that are requesting to send and are at the lowest absolute rank. When one of the buffers has more credits than the other one or more buffers, the process proceeds to step 660 and the WPR Scheduler 140 selects the requesting buffer with the most credits. The process then proceeds to step 665 and the WPR Scheduler 140 clears or zeros the accumulated credits for the selected buffer. The identity of the selected buffer is transmitted to the buffer selector 150 as the sending buffer data 156. The process then proceeds back to the start 605 and awaits the next clock cycle.

Returning to step 655, when there are multiple buffers that are requesting to send that are at the lowest absolute rank and there are multiple buffers with the same number of credits, the process proceeds to step 670. At step 670, the WPR Scheduler 140 randomly selects one of the requesting buffers with the same number of credits based on the configured probability weights for the buffers that appear in the WPT 162. For example, if there are two buffers at the lowest priority that are requesting to send and have the same number of credits and Buffer[1] has a 40% relative probability and Buffer[2] has a 60% probability, the WPR Scheduler 140 may randomly determine a number between 1 and 100. When the number is between 1 and 40, Buffer[1] is selected. When the number is between 41 and 100, Buffer[2] is selected. The process then proceeds to step 665 and the WPR Scheduler 140 clears or zeros the accumulated credits for the selected buffer. The identity of the selected buffer is transmitted to the buffer selector 150 as the sending buffer data 156. The process then proceeds back to the start 605 and awaits the next clock cycle.

Turning now to an illustration of packet cutting, in order to allocate bandwidth fairly to all buffers, the QoS Arbiter 120 implements a mechanism to force a buffer to stop sending mid packet to allow another buffer with a lower rank to start sending. This is known as packet cutting or simply "a cut".

A cut occurs when one or more buffers are requesting to send data to the sink and the current sending buffer's absolute rank increases (decays) such that it is no longer the lowest or tied for the lowest absolute rank. In this scenario, the Buffer Selector 150 forces the current sending buffer to stop sending (even if it is mid packet), and grants access to the sink to a requesting buffer with a lower rank as determined herein. As mentioned before, the Buffer Selector achieves this by forcing the buffer's acknowledge signal low prior to the packet's completion, signaling to the buffer that it has been cut. If multiple requesting buffers are tied for the lowest rank, the WPR Scheduler 140 randomly selects the new sending buffer based on the configured priority weights in the WPT 162. How the sink and the sources respond to a cut packet is outside the scope of the QoS' design. As mentioned above, when a buffer experiences a cut, the buffer either resets its data FIFO read address to the start of the packet to attempt retransmission, or sets the address to the end of the packet to drop it entirely from its queue depending on its configured mode or the number of times the packet has already been retried. When a new buffer is selected for transmission, the buffer may begin sending data from the current position of its FIFO read address. When the sink receives the cut signal 149, in one embodiment the sink may be storing the currently received word as it is being transmitted and may discard the word if the cut signal is received before the transmission is complete. In another embodiment, in response to a cut signal, the Buffer Selector may intentionally corrupt the word that is currently being transmitted to the sink, for example by altering the error correction coding or bit that is applied when the word is transmitted which causes the transmitted word to fail the sink's error check which in turn causes the sink to discard the word.

When a buffer is cut, the buffer must wait until its absolute rank decreases (recovers) enough to become the lowest, or tied for the lowest, rank among buffers requesting to send before it may be selected again. When the cut buffer is selected to send again, depending on the buffer's mode configuration, the buffer will either try to send the same packet that was cut again, from the beginning, or send the next packet queued.

With regard to buffer configuration modes, buffers may operate in either of two modes: retry mode or drop mode. When a buffer is configured in retry mode, when the buffer is again selected to transmit data, the buffer attempts to resend the cut packet again up to a configured max number of retries. More specifically, if the packet was cut in the middle, the buffer will attempt to resend the packet starting at the beginning. However, once the packet has been cut for the maximum number of retries, the buffer drops the packet instead of attempting to resend it and the buffer instead attempts to send the next queued packet.

When a buffer is configured in drop mode, the buffer simply drops any packet that is cut without retying and then attempts to send the next queued packet when the buffer is next selected to transmit data. In addition to dropping cut packets while in drop mode, a buffer also drops packets if the buffer requests access to the sink and is denied at the next sink ready cycle due to a different buffer being selected to send. Drop mode is intended to minimize the wait time of packets in a buffer's queue. If packets are not sent right away or get cut, they are immediately assumed to no longer be valid and are those discarded.

Table 3 illustrates an embodiment of minimum and maximum ranges for several parameters of the CBLC QoS arbitration system 100 as well as a typical range for a specific embodiment. The first three system parameters (Number of buffers, Source Clock Frequencies, and Sink Clock Frequency) represent global parameters for the system as a whole. The following 10 parameters (Buffer[n] Probability Weight, Buffer[n] Decay Function Constant (CD), Buffer[n] Recovery Function Constant (CR), Buffer[n] Maximum Rank, Buffer[n] Minimum Rank, Buffer[n] Maximum Retries (Cut Mode), Buffer[n] Maximum Number of Packets, Buffer[n] Maximum Size per Packet, WPR Credit Accumulation Interval, Buffer[n] WPR Credit Accumulation Amount) are specific to each individual buffer and may be varied independently for each buffer in order to tune the system. The following parameters may be stored in and/or retrievable by the Buffer Rank Calculator 130—Buffer[n] Decay Function Constant (CD), Buffer[n] Recovery Function Constant (CR), Buffer[n] Maximum Rank, Buffer[n] Minimum Rank, and Buffer[n] Maximum Retries (Cut Mode). The following parameters may be stored in and/or retrievable by the WPR Scheduler 140—Buffer[n] Probability Weight, WPR Credit Accumulation Interval, and Buffer[n] WPR Credit Accumulation Amount

TABLE 3

System Configuration Ranges

| Setting | Min | Max | Typical |
|---|---|---|---|
| Number of buffers | 2 | 128 | 8 |
| Source Clock Frequencies | 1 MHz | 1000 MHz | 200 MHz |
| Sink Clock Frequency | 1 MHz | 1000 MHz | 100 MHz |
| Buffer[n] Probability Weight | 1% | 100% | 5% |
| Buffer[n] Decay Function Constant ($C_D$) | 0.0 | 1.0 | 0.1 |
| Buffer[n] Recovery Function Constant ($C_R$) | 0.0 | 1.0 | 0.01 |
| Buffer[n] Maximum Rank | 0 | 256 | 256 |
| Buffer[n] Minimum Rank | 0 | 256 | 0 |
| Buffer[n] Maximum Retries (Cut Mode) | 0 | 256 | 3 |
| Buffer[n] Maximum Number of Packets | 4 | 8192 | 256 |
| Buffer[n] Maximum Size per Packet | 4 | 8192 | 2048 |
| WPR Credit Accumulation Interval | 1 ns | 1 × 10$^9$ ns | 100 ns |
| Buffer[n] WPR Credit Accumulation Amount | 1 | 100 | 1 |

In addition to the parameters identified above, the Buffer Rank Calculator 130 stores the current real rank and absolute rank for each buffer. Additionally, the CAE 164, when activated, stores the number of credits awarded to each buffer.

Below is one embodiment of a full CBLC QoS arbitration system 100 parameter configuration that is intended to represent a 'fair' access model. In this case, fair means that if a buffer requests to send a packet when its rank is at its initial (minimum) value, the CBLC QoS arbitration system 100 guarantees the delivery of the packet so long as its size is less than a configured threshold.

TABLE 4

Fair QoS Configuration
Configuration

| Setting | Value |
|---|---|
| Number of buffers | 4 |
| Buffer[1] Probability Weight | 20% |
| Buffer[2] Probability Weight | 40% |
| Buffer[3] Probability Weight | 30% |
| Buffer[4] Probability Weight | 10% |
| Buffer[n] Decay Function | $(1/22)x$ |
| Buffer[1] Recovery Function | $[20/(22 * 100)]x$ |
| Buffer[2] Recovery Function | $[40/(22 * 100)]x$ |
| Buffer[3] Recovery Function | $[30/(22 * 100)]x$ |
| Buffer[4] Recovery Function | $[10/(22 * 100)]x$ |

Based on the CBLC QoS arbitration system 100 parameter configuration in Table 4, we see that the maximum preserved packet size is 22 words. If a buffer sends a packet with a size greater than 22 words, the buffer's absolute rank increases while the packet is being transmitted, and will thus have a chance of being cut if another buffer is requesting to send. In this example, each buffer's recovery function has been configured to be a function of its probability weight and the maximum preserved packet size. This ensures that lower ranked buffers consume a portion of the sink bandwidth relative to their probability weight by having them recover slower after every packet sent.

Figure 7A:
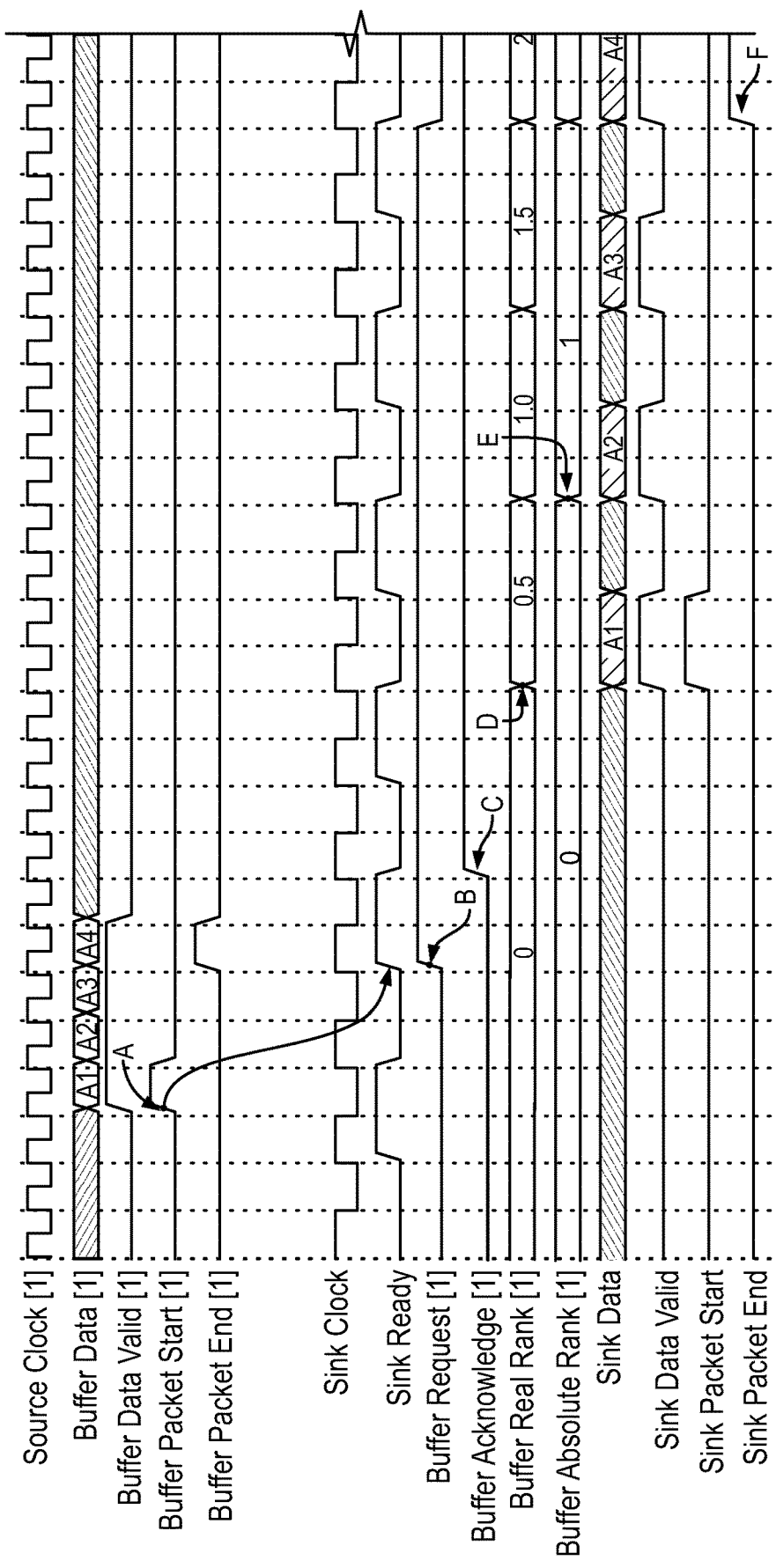
FIGS. 7A and 7B illustrate a timing diagram that highlights the basic operation of the CBLC QoS arbitration system when it receives a signal packet in one buffer and no other buffers are sending or requesting to send.
Figure 7B:
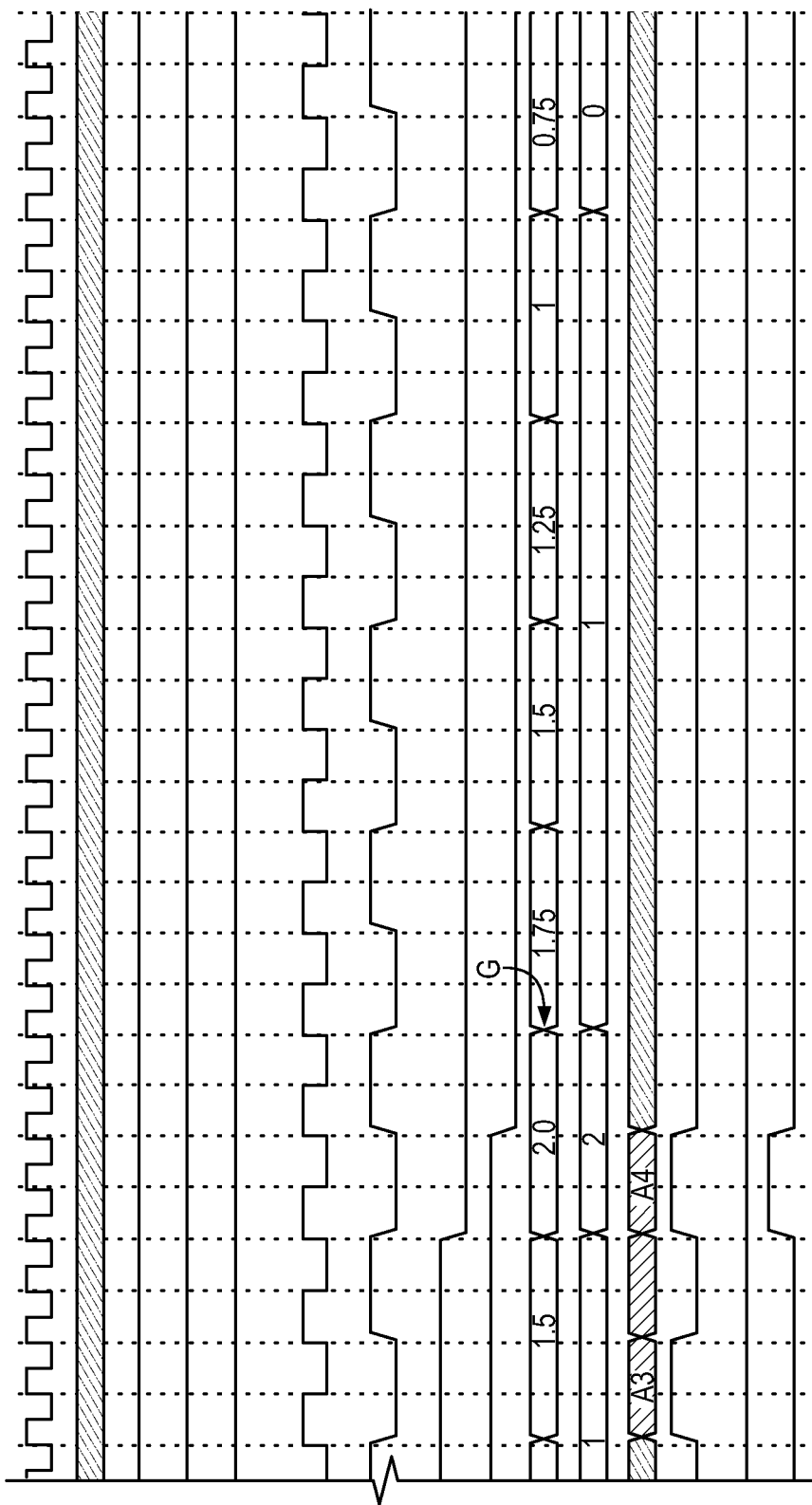

FIGS. 7A and 7B illustrate a timing diagram that highlights the basic operation of the CBLC QoS arbitration system 100 when it receives a signal packet in one buffer and no other buffers are sending or requesting to send. FIGS. 7A and 7B include the following signal traces over time as shown in the x-axis. FIG. 7B overlaps with and takes place immediately after FIG. 7A in time.

Source clock—this trace represents the high/low status of the source clock. The source clock controls when packets are received at an input buffer.

Buffer data—this trace identifies each individual word in a packet. As shown in FIG. 7, there are four words A1-A4 in the packet.

Buffer data valid—this trace is high when a buffer is receiving valid data.

Buffer packet start—this trace goes high when a packet arrives at the buffer

Buffer packet end—this trace goes low at the end of a valid packet

Sink clock—this trace represents the high/low status of the sink clock. The sink clock controls when words may be passed to the data sink.

Sink ready—this trace goes high at the start of each sync clock cycle to indicate when transmission of a word to the sink may commence.

Buffer request—this trace goes high the first time the sink ready trace goes high after a buffer packet start signal is received.

Buffer acknowledge—this trace goes high when the arbiter 120 gives a buffer access to the sink.

Buffer real rank—this trace represents the real rank of the buffer. As shown in FIG. 7, the real rank decays (rises) with each word transmitted in accordance with the buffer's specific decay function.

Buffer absolute rank—this trace represents the buffer real rank rounded down to the nearest whole integer.

Sink data—this trace represents the actual data words that are being transmitted to the sink.

Sink data valid—this trace goes high to indicate each sink clock cycle in which the Sink data, Sink packet start, and Sink packet end are valid.

Sink packet start—this trace goes high during the time the first word of a packet is transmitted to the sink.

Sink packet end—this trace goes high during the time the last word of a packet is transmitted to the sink.

In the example shown in FIGS. 7A and 7B, the Buffer[1] is configured to have a constant decay function of $\delta_1(x) = 0.5*x$ and a recovery function of $\rho_1(x) = 0.25*x$. As shown in FIGS. 7A and 7B, arrival of a packet at time A triggers the buffer to request access to the sink in the sink clock domain at time B. At time C, the Arbiter 120 grants Buffer[1] access to send data to the sink. At time D, the real rank of the buffer begins decaying for every word that it sends to the sink, in accordance with that buffer's decay function. At time E, the absolute rank of the buffer increases because the real rank of the buffer is now equal to 1.0. However no other buffer is requesting to send; therefore the Arbiter 120 continues to allow Buffer[1] to send data. At time F, the Buffer[1] signals the end of the sending packet and thus the Arbiter 120 is free to select a new buffer for the next clock cycle. At time G, the real rank of the Buffer[1] begins to recover in accordance with its recovery function because the buffer it is no longer sending and the system has reached the next sink clock cycle.

Figure 8A:
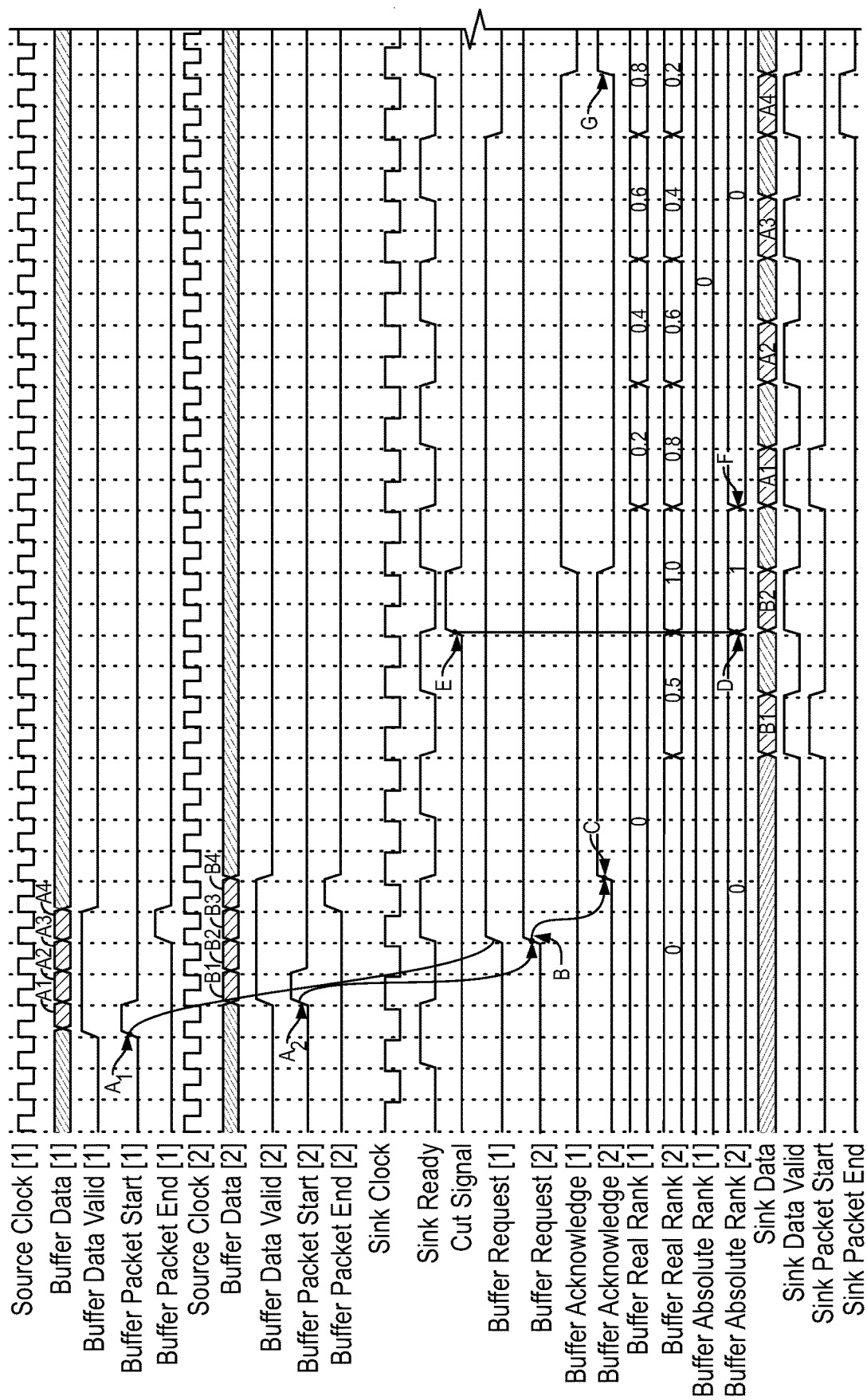
FIGS. 8A and 8B illustrate a timing diagram that highlights the basic operation of the CBLC QoS arbitration system when there is a collision between two packets arriving at relatively the same time in Buffer[1] and Buffer[2].
Figure 8B:
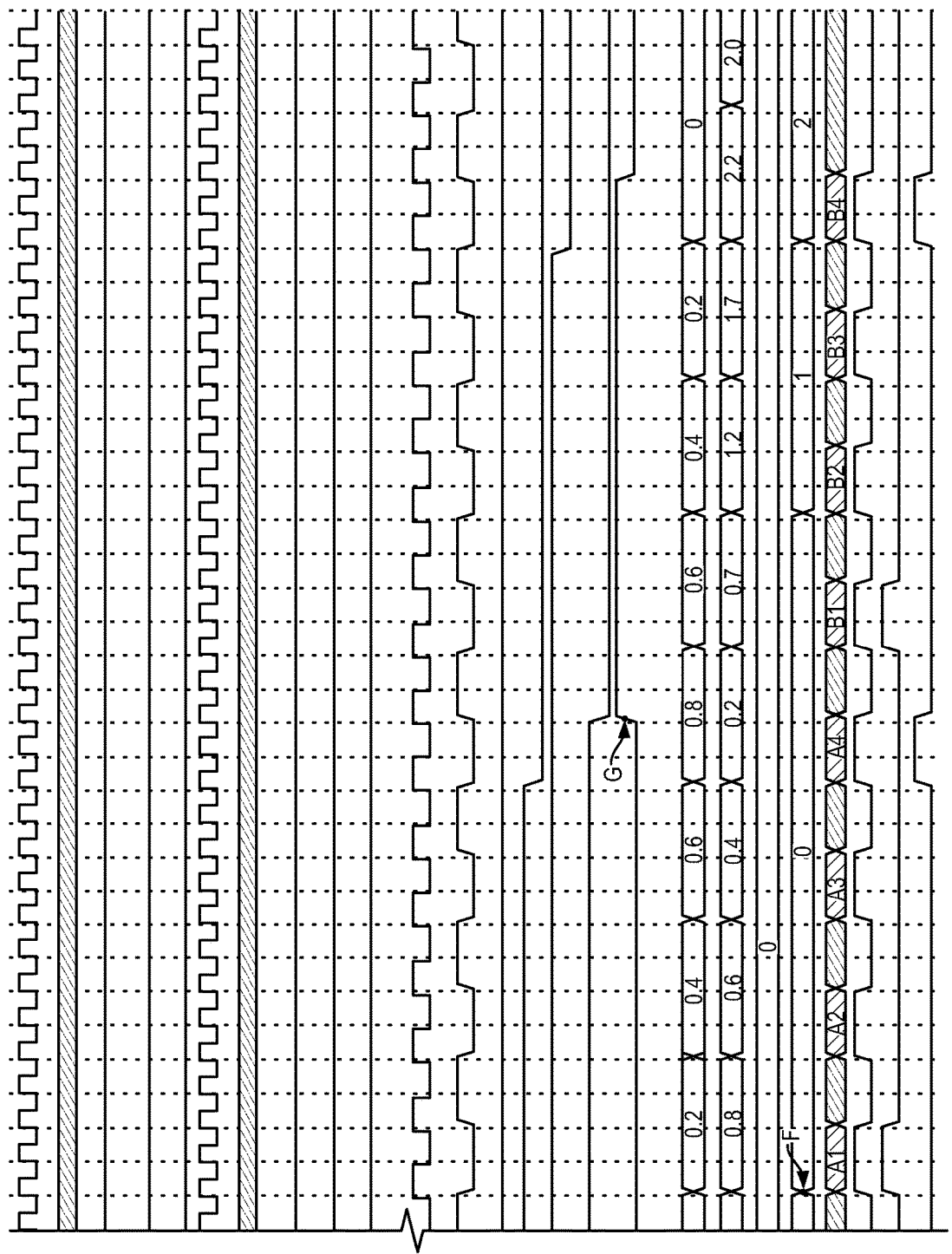

FIGS. 8A and 8B illustrate a timing diagram that highlights the basic operation of the CBLC QoS arbitration system 100 when there is a collision between two packets arriving at relatively the same time in Buffer[1] and Buffer[2]. FIGS. 8A and 8B include the following signal traces over time as shown in the x-axis. FIG. 8B overlaps with and takes place immediately after FIG. 8A in time.

Source clock[1]—this trace represents the high/low status of the source clock for Buffer[1]. The source clock controls when packets are received at Buffer[1].

Buffer data[1]—this trace identifies each individual word in a packet received at Buffer[1]. As shown in FIG. 8, there are four words A1-A4 in the packet received at Buffer[1].

Buffer data valid[1]—this trace is high when Buffer[1] is receiving valid data.

Buffer packet start[1]—this trace goes high when a packet arrives at Buffer[1].

Buffer packet end[1]—this trace goes low at the end of a valid packet at Buffer[1].

Source clock[2]—this trace represents the high/low status of the source clock for Buffer[2]. The source clock controls when packets are received at Buffer[2].

Buffer data[2]—this trace identifies each individual word in a packet received at Buffer[2]. As shown in FIG. 8, there are four words B1-B4 in the packet received at Buffer[2].

Buffer data valid[2]—this trace is high when Buffer[2] is receiving valid data.

Buffer packet start[2]—this trace goes high when a packet arrives at Buffer[2].

Buffer packet end[2]—this trace goes low at the end of a valid packet at Buffer[2].

Sink clock—this trace represents the high/low status of the sink clock. The sink clock controls when words may be passed to the data sink.

Sink ready—this trace goes high at the start of each sync clock cycle to indicate when transmission of a word to the sink may commence.

Cut signal—this trace goes high when the Arbiter 150 sends a cut signal to a buffer that is being cut.

Buffer request[1]—this trace goes high the first time the sink ready trace goes high after a buffer packet start signal is received from Buffer[1].

Buffer acknowledge[1]—this trace goes high when the arbiter 120 gives Buffer[1] access to the sink.

Buffer real rank[1]—this trace represents the real rank of Buffer[1]. As shown in FIG. 8, the real rank decays (rises) with each word transmitted in accordance with the buffer's specific decay function.

Buffer absolute rank[1]—this trace represents the Buffer [1] real rank rounded down to the nearest whole integer.

Buffer request[2]—this trace goes high the first time the sink ready trace goes high after a buffer packet start signal is received from Buffer[2].

Buffer acknowledge[2]—this trace goes high when the arbiter 120 gives Buffer[2] access to the sink.

Buffer real rank[2]—this trace represents the real rank of Buffer[2]. As shown in FIG. 8, the real rank decays (rises) with each word transmitted in accordance with the buffer's specific decay function.

Buffer absolute rank[2]—this trace represents the Buffer [2] real rank rounded down to the nearest whole integer.

Sink data—this trace represents the actual data words that are being transmitted to the sink.

Sink data valid—this trace goes high to indicate each sink clock cycle in which the Sink data, Sink packet start, and Sink packet end are valid.

Sink packet start—this trace goes high during the time the first word of a packet is transmitted to the sink.

Sink packet end—this trace goes high during the time the last word of a packet is transmitted to the sink.

In the example shown in FIGS. 8A and 8B the decay function for Buffer[1] is set to $\delta_1(x) = 0.2*x$ and the decay function for Buffer[2] is set to $\delta_2(x) = 0.5*x$. The recovery functions for both buffers are configured the same; $\rho_1(x) = \rho_2(x) = 0.2*x$.

As shown in FIGS. 8A and 8B, arrival of a packet at Buffer[1] at time $A_1$ and the arrival of a packet at Buffer[2] at $A_2$ triggers the buffers to request access to the sink in the sink clock domain at time B. Both requests arrive at the Arbiter 120 at the same time. Further, as described above, the Arbiter 120 determines that both Buffers have the same absolute rank. Thus, the WPR Scheduler 140 of the Arbiter 120 randomly selects one of the Buffers to be provided access to the sink in accordance with the WPT 162 as described above. In the example of FIGS. 8A and 8B, Buffer[2] is selected to send first as shown at time C.

As Buffer[2] begins transmitting the second word, Buffer [2]'s absolute rank rises to 1 at time D. However, the absolute rank of Buffer[1] remains at zero because Buffer[1] has not transmitted any words. Thus, the absolute rank of Buffer[2] had increased above that of Buffer[1] before it finishes sending the packet (only two of the four words of the packet—B1 and B2—have been sent). The Arbiter 150 cuts the packet from Buffer[2] by transmitting the cut signal to Buffer[2] at time E and allows Buffer[1] to start sending instead, as shown by the Buffer Acknowledge[1].

At time F, the absolute rank of Buffer[2] has recovered back down to 0 because the real rank of Buffer[2] is now less than 1 and the absolute rank is determined by rounding the real rank down to the next whole integer. However, at time F, both Buffer[1] and Buffer[2] have a rank of zero, so the Arbiter 120 continues to allow Buffer[1] to send because it is still tied for the lowest rank. Later, at time G, Buffer[1] completes sending its packet by transmitting the final word A4. Because Buffer[2] is now the only buffer requesting access to the sink, the Arbiter 120 switches access to the sink back to Buffer[2] as shown by the Buffer Acknowledge[2] signal going high.

Figure 9A:
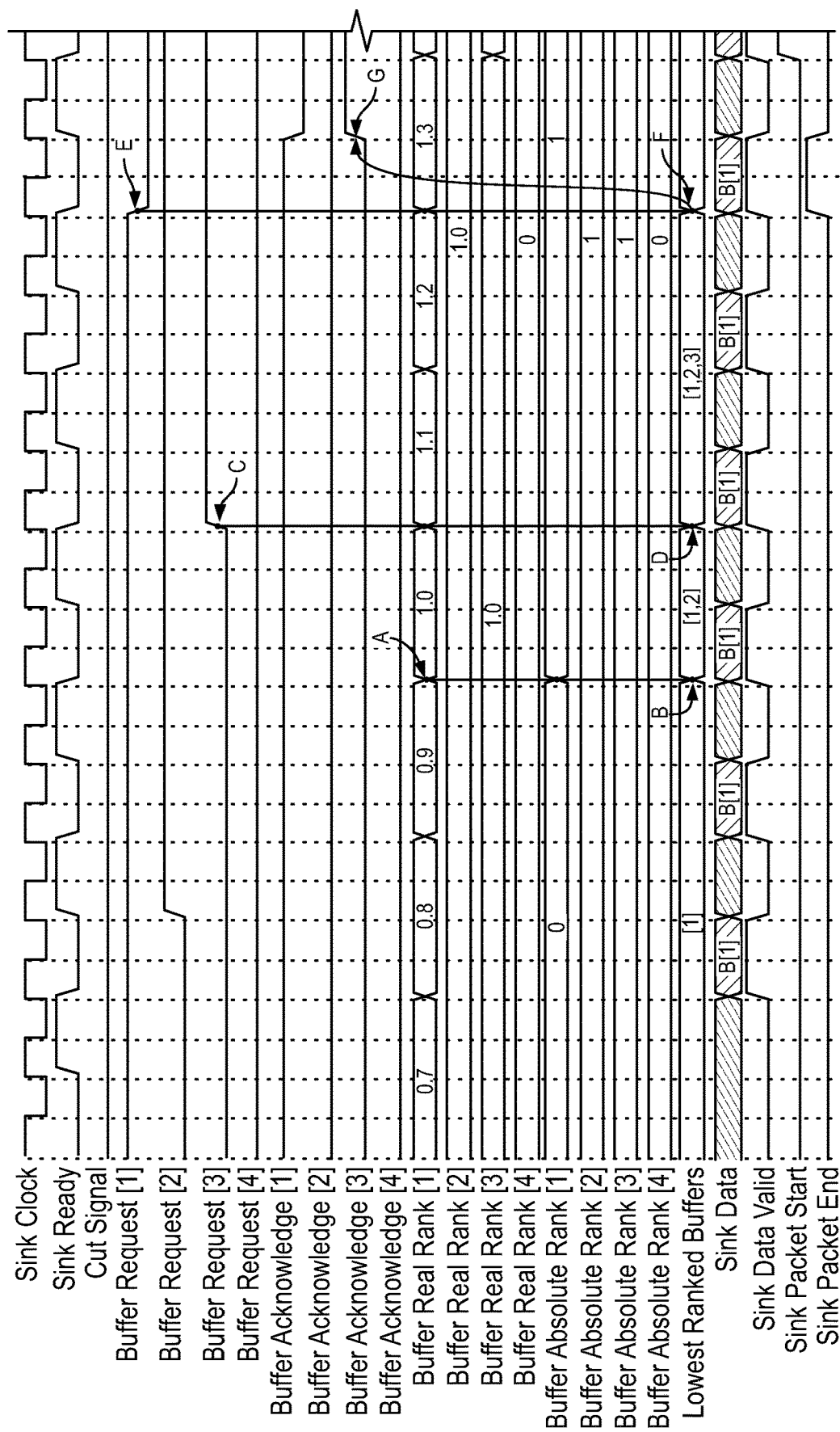
FIGS. 9A and 9B illustrate a timing diagram of the operation of the CBLC QoS arbitration system for a WPR collision example in a 4 Buffer system when the CAE is not enabled.
Figure 9B:
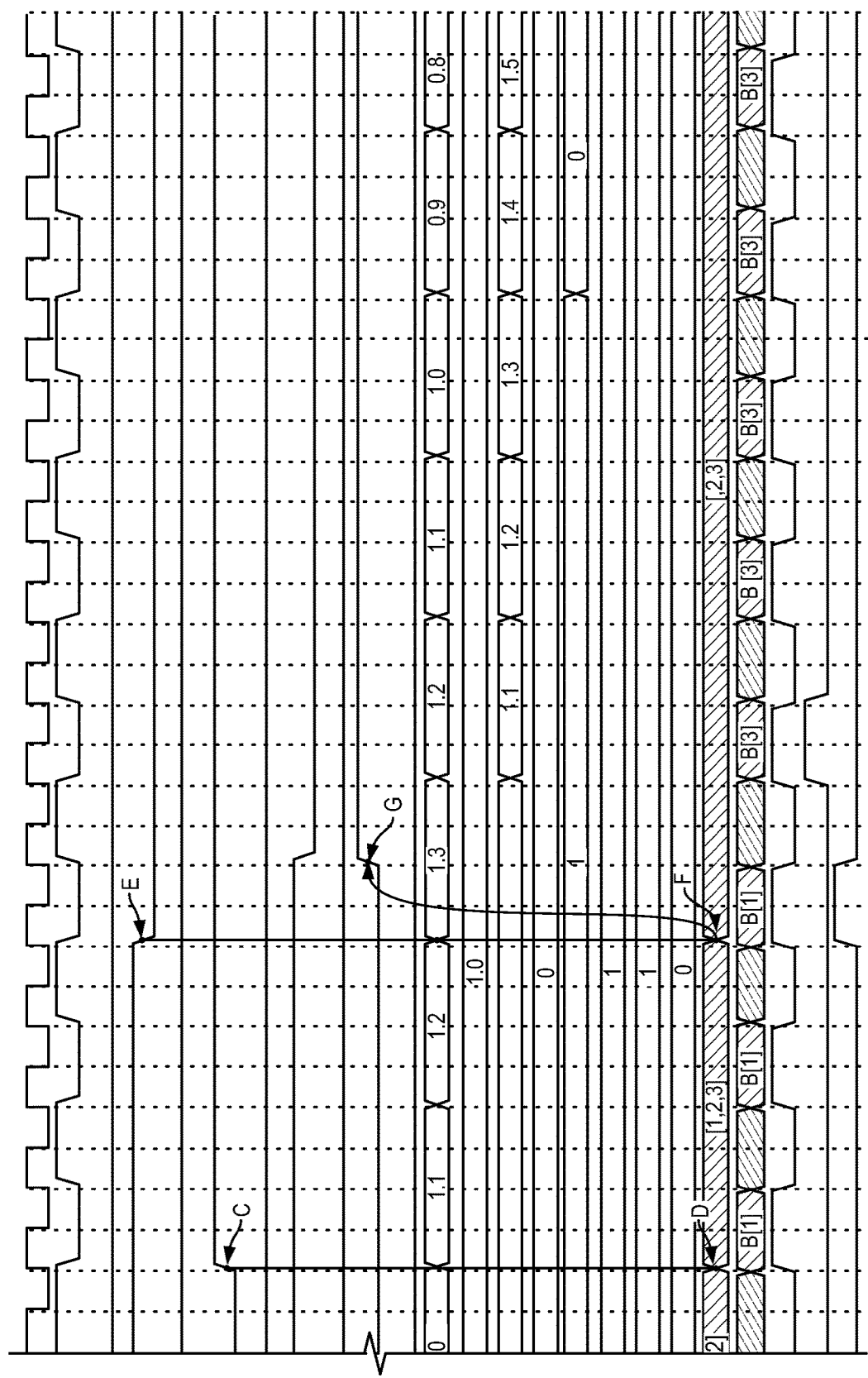

FIGS. 9A and 9B illustrate a timing diagram of the operation of the CBLC QoS arbitration system 100 for a WPR collision example in a 4 Buffer system when the CAE is not enabled. FIGS. 9A and 9B include the following signal traces over time as shown in the x-axis. FIG. 9B overlaps with and takes place immediately after FIG. 9A in time.

Sink clock—this trace represents the high/low status of the sink clock. The sink clock controls when words may be passed to the data sink.

Sink ready—this trace goes high at the start of each sync clock cycle to indicate when transmission of a word to the sink may commence.

Cut signal—this trace goes high when the Arbiter 150 sends a cut signal to a buffer that is being cut.

Buffer request[1]—this trace goes high the first time the sink ready trace goes high after a buffer packet start signal is received from Buffer[1].

Buffer request[2]—this trace goes high the first time the sink ready trace goes high after a buffer packet start signal is received from Buffer[2].

Buffer request[3]—this trace goes high the first time the sink ready trace goes high after a buffer packet start signal is received from Buffer[3].

Buffer request[4]—this trace goes high the first time the sink ready trace goes high after a buffer packet start signal is received from Buffer[4].

Buffer acknowledge[1]—this trace goes high when the arbiter 120 gives Buffer[1] access to the sink.

Buffer acknowledge[2]—this trace goes high when the arbiter 120 gives Buffer[2] access to the sink.

Buffer acknowledge[3]—this trace goes high when the arbiter 120 gives Buffer[3] access to the sink.

Buffer acknowledge[4]—this trace goes high when the arbiter 120 gives Buffer[4] access to the sink.

Buffer real rank[1]—this trace represents the real rank of Buffer[1]. As shown in FIG. 9, the real rank decays (rises) with each word transmitted in accordance with the buffer's specific decay function.

Buffer real rank[2]—this trace represents the real rank of Buffer[2]. As shown in FIG. 9, the real rank decays (rises) with each word transmitted in accordance with the buffer's specific decay function.

Buffer real rank[3]—this trace represents the real rank of Buffer[3]. As shown in FIG. 9, the real rank decays (rises) with each word transmitted in accordance with the buffer's specific decay function.

Buffer real rank[4]—this trace represents the real rank of Buffer[4]. As shown in FIG. 9, the real rank decays (rises) with each word transmitted in accordance with the buffer's specific decay function.

Buffer absolute rank[1]—this trace represents the Buffer [1] real rank rounded down to the nearest whole integer.

Buffer absolute rank[2]—this trace represents the Buffer [2] real rank rounded down to the nearest whole integer.

Buffer absolute rank[3]—this trace represents the Buffer [3] real rank rounded down to the nearest whole integer.

Buffer absolute rank[4]—this trace represents the Buffer [4] real rank rounded down to the nearest whole integer.

Lowest Ranked Buffers—this trace indicates which buffers are currently at the lowest ranking.

Sink data—this trace represents the actual data words that are being transmitted to the sink.

Sink data valid—this trace goes high to indicate each sink clock cycle in which the Sink data, Sink packet start, and Sink packet end are valid.

Sink packet start—this trace goes high during the time the first word of a packet is transmitted to the sink.

Sink packet end—this trace goes high during the time the last word of a packet is transmitted to the sink.

As shown in both FIGS. 9A and 9B, prior to time A, Buffer[1] is transmitting words to the sink as is shown by the increase in the Buffer Real Rank[1] and the Sink Data. Prior to time A, Buffer[1]'s absolute rank is seen to be zero. However, at time A, Buffer Absolute Rank[1] has decayed to 1 due to the Buffer Real Rank[1] rising to 1. Prior to time A, Buffer[2] has already made a request to transmit data to the sink—as shown by the Buffer Request[2] trace going high. However, no other buffers have yet requested access to the sink.

Consequently, at time A, both Buffer[1] and Buffer[2] have made Buffer Requests to transmit data to the sink and both Buffer[1] and Buffer[2] have the same absolute rank—as indicated by the Lowest Ranked Buffers trace at B. However, Buffer[1] is already transmitting to the sink, so Buffer[1] is allowed to continue transmitting to the sink and Buffer[2] waits.\

At time C, Buffer[3] requests to send data to the sink as shown by the Buffer Request[3] trace going high. The absolute rank of Buffer[3] is also 1 as shown by the Buffer Absolute Rank[3] trace. Consequently, as shown at D in the Lowest Ranked Buffers trace, all of Buffers[1], [2] and [3] are currently tied for the lowest ranked buffer at a rank of 1. However, Buffer[1] is already transmitting to the sink and is allowed to continue transmitting to the sink.

However, at time F, Buffer[1] begins transmitting the final word of its packet. Consequently, the Buffer Request[1] trace goes low as shown at E. Additionally, Buffer[1] is removed from the lowest ranked buffer trace at F because Buffer[1] is no longer attempting to transmit data to the sink. Now Buffer[2] and [3] are the lowest ranked buffers.

At F, the WPR Scheduler 140 determines that there is a collision because there are two buffers that are both at the lowest priority that are requesting to send data to the sink and one of the buffers must be chosen to do so. As described above, the WPR Scheduler 140 then randomly selects one of Buffer[2] and Buffer[3] based on their relative weights in the WPT 162. In the example of FIGS. 9A and 9B, the WPR Scheduler 140 has randomly selected Buffer[3] to send, to the WPR Scheduler 140 transmits a signal to Buffer[3] as shown by the Buffer Acknowledge[3] trace going high at G. Buffer[3] then begins transmitting words to the sink as shown in the sink data trace and the increase in the Buffer Real Rank[3], which takes place according to Buffer[3]'s individual decay equation. Additionally, the Buffer Real Rank[1] is shown to decrease for each cycle in which Buffer[1] does not transmit a word in accordance with Buffer[1]'s recovery equation.

Figure 10A:
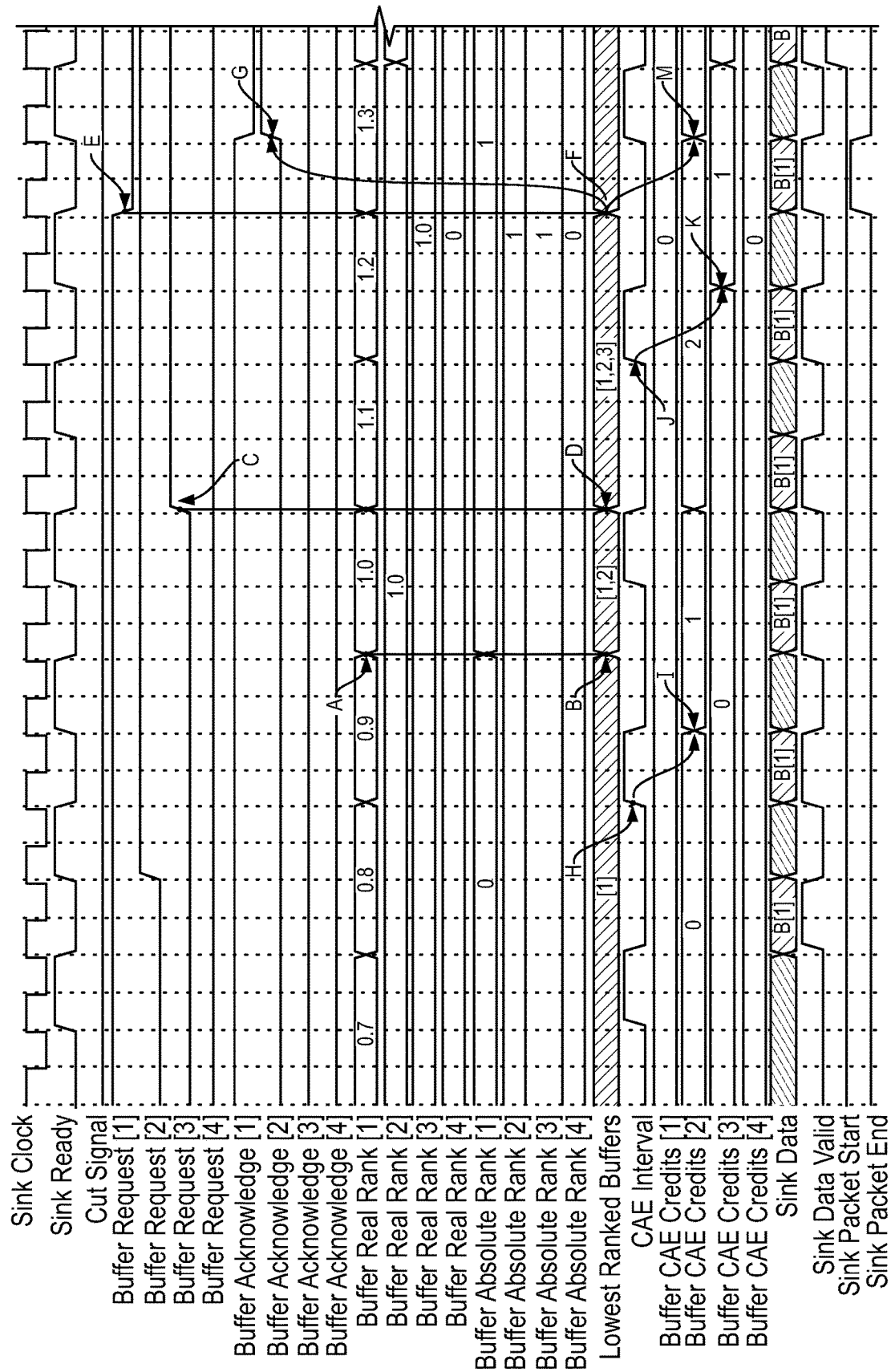
FIGS. 10A and 10B illustrate a timing diagram of the operation of the CBLC QoS arbitration system for a WPR collision example in a 4 Buffer system when the CAE is enabled.
Figure 10B:
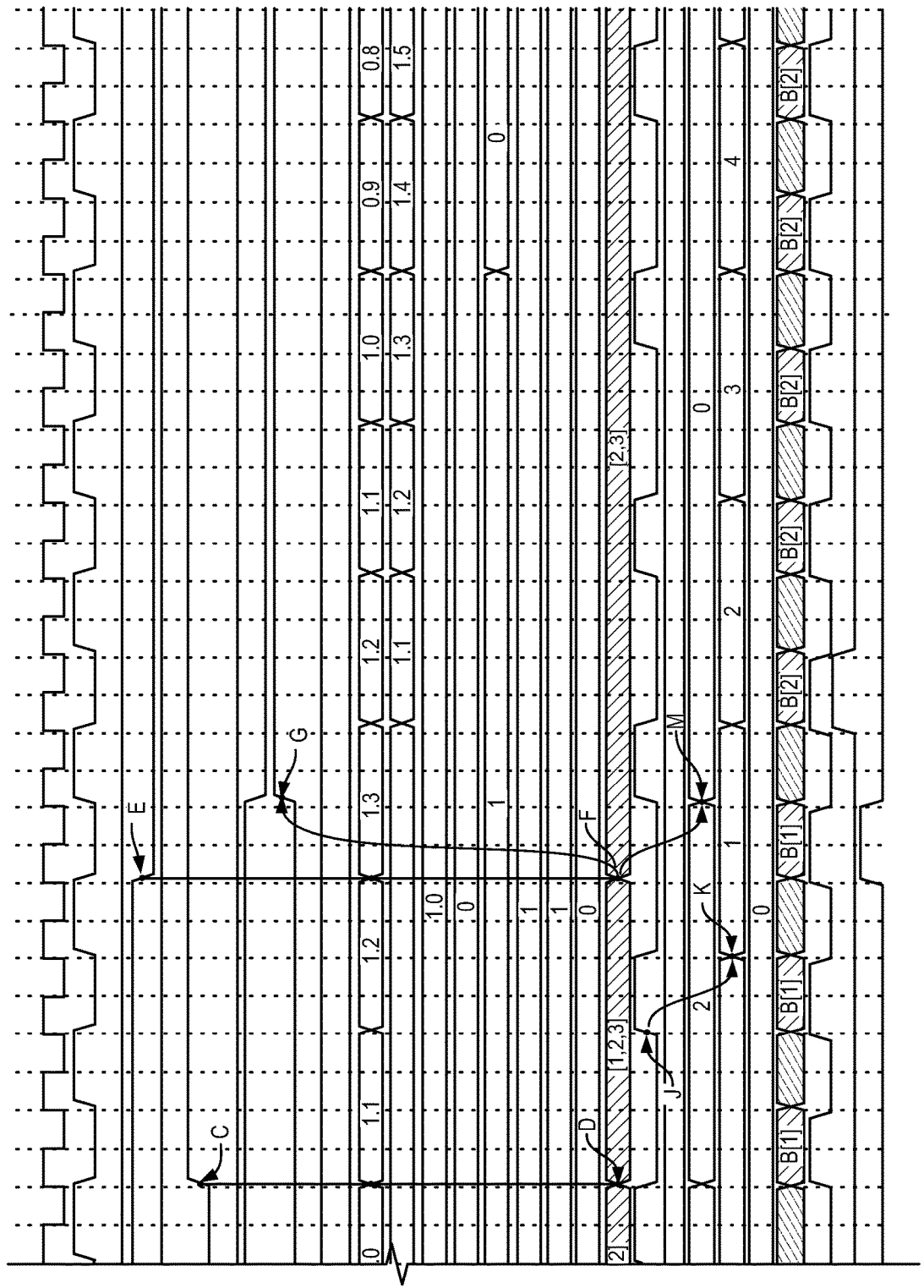

FIGS. 10A and 10B illustrate a timing diagram of the operation of the CBLC QoS arbitration system 100 for a WPR collision example in a 4 Buffer system when the CAE is enabled. FIG. 10B overlaps with and takes place immediately after FIG. 10A in time. FIGS. 10A and 10B include the same signal traces over time as FIGS. 9A and 9B with the addition of the following signal traces:

CAE Interval—this trace indicates the Credit Allocation Engine Interval. The CAE awards credits at the end of each CAE interval.

Buffer CAE Credits[1]—This trace indicates the total accumulated CAE credits for Buffer [1].

Buffer CAE Credits[2]—This trace indicates the total accumulated CAE credits for Buffer [2].

Buffer CAE Credits[3]—This trace indicates the total accumulated CAE credits for Buffer [3].

Buffer CAE Credits[4]—This trace indicates the total accumulated CAE credits for Buffer [4].

In the example of FIGS. 10A and 10B, the same operation and data collision indicated above in FIGS. 9A and 9B takes place. That is, at time A, both Buffer[1] and Buffer[2] have made Buffer Requests to transmit data to the sink and both Buffer[1] and Buffer[2] have the same absolute rank—as indicated by the Lowest Ranked Buffers trace at B. However, Buffer[1] is already transmitting to the sink, so Buffer [1] is allowed to continue transmitting to the sink and Buffer[2] waits.

At time C, Buffer[3] requests to send data to the sink as shown by the Buffer Request[3] trace going high. The absolute rank of Buffer[3] is also 1 as shown by the Buffer Absolute Rank[3] trace. Consequently, as shown at D in the Lowest Ranked Buffers trace, all of Buffers[1], [2] and [3] are currently tied for the lowest ranked buffer at a rank of 1. However, Buffer[1] is already transmitting to the sink and is allowed to continue transmitting to the sink.

However, at time F, Buffer[1] begins transmitting the final word of its packet. Consequently, the Buffer Request[1] trace goes low as shown at E. Additionally, Buffer[1] is removed from the lowest ranked buffer trace at F because Buffer[1] is no longer attempting to transmit data to the sink. Now Buffer[2] and [3] are the lowest ranked buffers.

At F, the WPR Scheduler 140 determines that there is a collision because there are two buffers that are both at the lowest priority that are requesting to send data to the sink and one of the buffers must be chosen to do so. However, in FIGS. 10A and 10B, instead of randomly selecting a Buffer based on the WPT 162, the WPR Scheduler 140 employs the CAE 164.

Turning to the traces representing the actions of the CAE, at H, Buffer[1] is transmitting to the sink, but Buffer[2] has requested to transmit to the sink (as shown by the Buffer Request[2] trace going high) but is not able to transmit to the sink during the current CAE interval. Consequently, the CAE 164 allocates a credit to Buffer[2] as shown in the Buffer CAE Credits[2] at I. Further, during the next CAE interval, Buffer[2] is also not able to transmit because Buffer[1] is still transmitting. Consequently, the CAE 164 allocates an additional credit to Buffer[2] as shown in the Buffer CAE Credits[2] at the same time at C and D. Buffer CAE Credits[2] has now risen to two.

However, at C, Buffer[3] has requested access to the sink. Consequently, at the next CAE interval at J, both Buffer[2] and Buffer[3] have requested access to the sink, but are not allowed to transmit data to the sink. With the CAE enabled, Buffers[2] would accumulate credits automatically each interval its request line is asserted while Buffers[3]'s request line is de-asserted. However, at J, when Buffer[3] also asserts its request line, then the CAE 164 uses the Weighted Priority Table 162 to select between either Buffers[2] or Buffer[3] to assign credits to. In one embodiment, Buffer[2] has a 40% chance of being assigned credits while Buffer[3] has a 60% chance every interval due to their relative probability weights configured in the Weighted Priority Table 162. As shown in FIGS. 10A and 10B, at K, Buffer[3] has been randomly chosen by the CAE 164 and is awarded the credit as shown in Buffer CAE Credits[3]. However, Buffer[2] has still not be able to transmit to the sink so consequently retains its current credit value of 2 as shown in the Buffer CAE Credits [2]/

As mentioned above, at F, Buffer[1] has completed sending it packet and the WPR Scheduler 140 determines that there is a collision between Buffer[2] and Buffer[3] because there are two buffers that are both at the lowest priority that are requesting to send data to the sink and one of the buffers must be chosen to do so. In this example, the WPR Scheduler 140 resolves the collision by checking the number of credits each buffer accumulated (as shown in the Buffer CAE Credits) and selects the buffer with the highest number of credits to send data to the sink next. In the event of a tie for the highest number of accumulated credits between two or more buffers, the WPR Scheduler 140 uses the Weighted Priority Table 162 to randomly select a winning buffer from among those tied. By doing this, again the relative probabilities between each buffer of being selected is maintained.

As shown in FIGS. 10A and 10B at time F, Buffer CAE Credits[2] is greater than Buffer CAE Credits[3]. Consequently, the WPR Scheduler 140 transmits the Buffer Acknowledge[2] signal to Buffer[2] as shown at G, and Buffer[2] is now able to transmit data to the sink. Additionally, because Buffer[2] is now able to transmit data to the sink, Buffer[2]'s CAE credits are cleared back down to zero as shown at M.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A buffer arbitration communication system, said system including:

a first buffer, wherein said first buffer receives a first packet, wherein said first packet includes at least one first packet word, wherein said first buffer is associated with a first buffer real rank;

a second buffer, wherein said second buffer receives a second packet, wherein said second packet includes at least one second packet word, wherein said second buffer is associated with a second buffer real rank;

a data sink, wherein said data sink may receive data words from either said first buffer or said second buffer;

a buffer rank calculator, wherein said buffer rank calculator stores said first buffer real rank and said second buffer real rank, wherein said first buffer real rank is increased according to a first stored decay equation for each first packet word transmitted by said first buffer to said sink, wherein said first buffer real rank is decreased according to a first stored recovery equation for each sink transmission cycle during which said first buffer does not transmit a first packet word to said sink, down to a minimum of a predetermined minimum rank for said first buffer, wherein said second buffer real rank is increased according to a second stored decay equation for each second packet word transmitted by said second buffer to said sink, wherein said second stored decay equation differs from said first stored decay equation, wherein said second buffer real rank is decreased according to a second stored recovery equation for each sink transmission cycle during which said second buffer does not transmit a second packet word to said sink, down to a minimum of a predetermined minimum rank for said second buffer, wherein said buffer rank calculator determines a first buffer absolute rank by rounding said first buffer real rank down to the next whole integer, wherein said buffer rank calculator determines a second buffer absolute rank by rounding said second buffer real rank down to the next whole integer; and a buffer selector wherein said buffer selector selects which of said first buffer and said second buffer to allow to transmit words to said sink, wherein said buffer selector selects said first buffer when said first buffer absolute rank is less than said second buffer absolute rank and selects said second buffer when said second buffer absolute rank is less than said first buffer absolute rank.

2. The system of claim 1 wherein said first stored decay equation differs from said second stored decay equation.

3. The system of claim 1 wherein said first stored recovery equation differs from said second stored recovery equation.

4. The system of claim 1 wherein said predetermined minimum rank for said first buffer differs from said predetermined minimum rank for said second buffer.

5. The system of claim 1 further including a Weighted Priority Randomized (WPR) Scheduler,
   wherein said WPR Scheduler includes a Weighted Priority Table,
   wherein said Weighted Priority Table includes a first buffer selection probability and a second buffer selection probability.

6. The system of claim 5 wherein, when said first buffer absolute rank equals said second buffer absolute rank, said WPR Scheduler uses said first buffer selection probability and said second buffer selection probability to randomly select which of said first buffer and said second buffer to allow to transmit data to said sink.

7. The system of claim 5 further including a Credit Accumulation Engine (CAE),
   wherein said CAE includes a first buffer credit entry and a second buffer credit entry,
   wherein said CAE awards a credit to said first buffer by incrementing said first buffer credit entry when said second buffer is transmitting data to said sink and said first buffer is unable to transmit data to said sink,
   wherein said CAE awards a credit to said second buffer by incrementing said second buffer credit entry when said first buffer is transmitting data to said sink and said second buffer is unable to transmit data to said sink.

8. The system of claim 7 wherein, when neither of said first buffer and said second buffer are currently transmitting data to said sink and said first buffer absolute rank equals said second buffer absolute rank, said WPR Scheduler compares said first buffer credit entry with said second buffer credit entry and allows the buffer having the higher credit entry to communicate with said sink.

9. The system of claim 8 wherein, when said first buffer credit entry equals said second buffer credit entry, said WPR Scheduler uses said first buffer selection probability and said second buffer selection probability to randomly select which of said first buffer and said second buffer to allow to transmit data to said sink.

10. The system of claim 7 wherein said credit awarded to said first buffer is different from said credit awarded to said second buffer.

11. A method for arbitrating between buffers, said method including:
   receiving a first packet at a first buffer, wherein said first packet includes at least one first packet word,
      wherein said first buffer is associated with a first buffer real rank;
   receiving a second packet at a second buffer, wherein said second packet includes at least one second packet word,
      wherein said second buffer is associated with a second buffer real rank;
   providing a data sink that is configured to optionally receive data words from either said first buffer or said second buffer;
   storing said first buffer real rank and said second buffer real rank at a buffer rank calculator,
   increasing said first buffer real rank according to a first stored decay equation for each first packet word transmitted by said first buffer to said sink,
   decreasing said first buffer real rank according to a first stored recovery equation for each sink transmission cycle during which said first buffer does not transmit a first packet word to said sink, down to a minimum of a predetermined minimum rank for said first buffer,
   increasing said second buffer real rank according to a second stored decay equation for each second packet word transmitted by said second buffer to said sink, wherein said second stored decay equation differs from said first stored decay equation,
   decreasing said second buffer real rank according to a second stored recovery equation for each sink transmission cycle during which said second buffer does not transmit a second packet word to said sink, down to a minimum of a predetermined minimum rank for said second buffer
   determining, using said buffer rank calculator, a first buffer absolute rank by rounding said first buffer real rank down to the next whole integer,
   determining, using said buffer rank calculator, a second buffer absolute rank by rounding said second buffer real rank down to the next whole integer; and
   selecting, using a buffer selector, which of said first buffer and said second buffer to allow to transmit words to said sink,
   wherein said buffer selector selects said first buffer when said first buffer absolute rank is less than said second buffer absolute rank and selects said second buffer when said second buffer absolute rank is less than said first buffer absolute rank.

12. The method of claim 11 wherein said first stored decay equation differs from said second stored decay equation.

13. The method of claim 11 wherein said first stored recovery equation differs from said second stored recovery equation.

14. The method of claim 11 wherein said predetermined minimum rank for said first buffer differs from said predetermined minimum rank for said second buffer.

15. The method of claim 11 further including providing a Weighted Priority Randomized (WPR) Scheduler,
   wherein said WPR Scheduler includes a Weighted Priority Table,
   wherein said Weighted Priority Table includes a first buffer selection probability and a second buffer selection probability.

16. The method of claim 15 wherein, when said first buffer absolute rank equals said second buffer absolute rank, said WPR Scheduler uses said first buffer selection probability and said second buffer selection probability to randomly select which of said first buffer and said second buffer to allow to transmit data to said sink.

17. The method of claim 15 further including providing a Credit Accumulation Engine (CAE),
- wherein said CAE includes a first buffer credit entry and a second buffer credit entry,
- awarding a credit, using said CAE, to said first buffer by incrementing said first buffer credit entry when said second buffer is transmitting data to said sink and said first buffer is unable to transmit data to said sink,
- awarding a credit, using said CAE, to said second buffer by incrementing said second buffer credit entry when said first buffer is transmitting data to said sink and said second buffer is unable to transmit data to said sink.

18. The method of claim 17 wherein, when neither of said first buffer and said second buffer are currently transmitting data to said sink and said first buffer absolute rank equals said second buffer absolute rank, said WPR Scheduler compares said first buffer credit entry with said second buffer credit entry and allows the buffer having the higher credit entry to communicate with said sink.

19. The method of claim 18 wherein, when said first buffer credit entry equals said second buffer credit entry, said WPR Scheduler uses said first buffer selection probability and said second buffer selection probability to randomly select which of said first buffer and said second buffer to allow to transmit data to said sink.

20. The method of claim 17 wherein said credit awarded to said first buffer is different from said credit awarded to said second buffer.

* * * * *